(12) United States Patent
Luthe et al.

(10) Patent No.: US 11,855,557 B2
(45) Date of Patent: Dec. 26, 2023

(54) DEVICE AND METHOD FOR PREVENTING A COLLISION WHEN DRIVING AT LEAST TWO MOVERS ON A DRIVE SURFACE

(71) Applicant: Beckhoff Automation GmbH, Verl (DE)

(72) Inventors: Thomas Luthe, Verl (DE); Hubertus Pennekamp, Gütersloh (DE); Eva Wiedner, Hövelhof (DE); Tobias Weber, Verl (DE); Klaus Neumann, Gütersloh (DE); Alexander Weddemann, Lippstadt (DE)

(73) Assignee: Beckhoff Automation GmbH, Verl (DE)

( * ) Notice: Subject to any disclaimer, the term of this patent is extended or adjusted under 35 U.S.C. 154(b) by 369 days.

(21) Appl. No.: 17/324,911

(22) Filed: May 19, 2021

(65) Prior Publication Data

US 2021/0273592 A1    Sep. 2, 2021

Related U.S. Application Data

(63) Continuation of application No. PCT/EP2019/082298, filed on Nov. 22, 2019.

(30) Foreign Application Priority Data

Nov. 26, 2018 (DE) ............... 10 2018 129 727.0

(51) Int. Cl.
  *H02P 8/00* (2006.01)
  *H02P 25/064* (2016.01)
  *H02K 41/03* (2006.01)

(52) U.S. Cl.
  CPC ......... *H02P 25/064* (2016.02); *H02K 41/031* (2013.01); *H02K 2201/18* (2013.01)

(58) Field of Classification Search
  CPC ............... H02P 25/064; H02K 41/031; H02K 2201/18; H02K 16/02; G05B 2219/50393
  See application file for complete search history.

(56) References Cited

U.S. PATENT DOCUMENTS 6,097,114 A    8/2000 Hazelton
6,316,849 B1   11/2001 Trumper et al.
(Continued)

FOREIGN PATENT DOCUMENTS

CN    1330807 A    1/2002
CN    101537932 A    9/2009
(Continued)

OTHER PUBLICATIONS

Office Action dated Jan. 6, 2022 in connection with Chinese patent application No. 201980077654.5, 7 pages Including English translation.
(Continued)

*Primary Examiner* — Muhammad S Islam
(74) *Attorney, Agent, or Firm* — Dorsey & Whitney LLP

(57) ABSTRACT

A method for preventing collisions when driving at least two movers on a drive surface, each mover comprising at least one magnetic field generator, with a device comprising a plurality of plate-shaped sectors, the sectors each comprising at least one electric magnetic field generator. The sectors form the drive surface, generating magnetic fields via control of a power supply of the electric magnetic field generators such that the movers are movable over the drive surface in at least one direction. A first path planning for the first mover is carried out, an estimated second travel path of the second mover is determined or received, and the estimated second travel path of the second mover is taken into account in the first path planning of the first mover to determine a
(Continued)

first travel path for the first mover such that collision of the first mover with the second mover is prevented.

20 Claims, 12 Drawing Sheets

(56) References Cited

U.S. PATENT DOCUMENTS

| | | |
|---|---|---|
| 6,339,266 B1 | 1/2002 | Tanaka |
| 6,417,914 B1 | 7/2002 | Li |
| 6,835,941 B1 | 12/2004 | Tanaka |
| 7,339,289 B2 | 3/2008 | Wang et al. |
| 8,281,888 B2 | 10/2012 | Bergmann |
| 9,187,268 B2 | 11/2015 | Denninger et al. |
| 9,202,719 B2 | 12/2015 | Lu et al. |
| 9,701,487 B2 | 7/2017 | Unterseher |
| 10,222,237 B2 | 3/2019 | Lu |
| 10,352,953 B2 | 7/2019 | Huber et al. |
| 10,370,195 B2 | 8/2019 | Huber |
| 10,509,049 B2 | 12/2019 | Sinz et al. |
| 10,669,049 B2 | 6/2020 | Eberhardt et al. |
| 10,763,733 B2 | 9/2020 | Lu |
| 2005/0107909 A1 | 5/2005 | Wynblatt et al. |
| 2011/0093134 A1 | 4/2011 | Emanuel et al. |
| 2017/0179805 A1* | 6/2017 | Lu ............................. H02P 8/00 |
| 2017/0179806 A1 | 6/2017 | Lu |
| 2018/0217174 A1 | 8/2018 | Malinowski |
| 2021/0273593 A1 | 9/2021 | Luthe et al. |
| 2021/0278863 A1 | 9/2021 | Uthe et al. |
| 2021/0281203 A1 | 9/2021 | Luthe et al. |
| 2021/0328493 A1 | 10/2021 | Luthe et al. |

FOREIGN PATENT DOCUMENTS

| | | |
|---|---|---|
| CN | 101779368 A | 7/2010 |
| CN | 103135640 A | 6/2013 |
| CN | 103891114 A | 6/2014 |
| CN | 104094507 A | 10/2014 |
| CN | 105307960 A | 2/2016 |
| CN | 105452812 A | 3/2016 |
| CN | 105600469 A | 5/2016 |
| CN | 106168627 A | 11/2016 |
| CN | 106716141 A | 5/2017 |
| CN | 107852082 A | 3/2018 |
| DE | 102009008529 A1 | 9/2010 |
| DE | 102006007623 B4 | 6/2015 |
| DE | 102015209610 A1 | 12/2016 |
| DE | 102017131304 A1 | 6/2019 |
| DE | 102017131314 A1 | 6/2019 |
| DE | 102017131321 A1 | 6/2019 |
| DE | 102018129727 A1 | 5/2020 |
| DE | 102018129731 A1 | 5/2020 |
| DE | 102018129732 A1 | 5/2020 |
| DE | 102018129738 A1 | 5/2020 |
| DE | 102018129739 A1 | 5/2020 |
| EP | 2047376 B1 | 8/2015 |
| EP | 3095739 A1 | 11/2016 |
| EP | 3096144 A1 | 11/2016 |
| EP | 3385803 A1 | 10/2018 |
| EP | 3868005 B1 | 6/2022 |
| JP | H03112393 A | 5/1991 |
| JP | 2000125536 A | 4/2000 |
| WO | 2013059934 A1 | 5/2013 |
| WO | 2013064656 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2016012157 A1 | 1/2016 |
| WO | 2016012160 A1 | 1/2016 |
| WO | 2016012171 A1 | 1/2016 |
| WO | 2017004716 A1 | 1/2017 |
| WO | 2018176137 A1 | 10/2018 |
| WO | 2019170488 A1 | 9/2019 |
| WO | 2020109168 A1 | 6/2020 |
| WO | 2020109180 A1 | 6/2020 |
| WO | 2020109274 A1 | 6/2020 |
| WO | 2020109276 A1 | 6/2020 |
| WO | 2020109287 A1 | 6/2020 |

OTHER PUBLICATIONS

Office Action dated Nov. 29, 2021 in connection with Chinese Patent Application No. 201980077558.3, 10 pages including English translation.

International Search Report and Written Opinion in connection with PCT/EP2019/082536 dated Jun. 4, 2020, 25 pages including English translation.

International Search Report and Written Opinion dated Jun. 4, 2020 in connection with International Patent Application No. PCT/EP2019/082298, 25 pages including English translation.

International Search Report and Written Opinion dated Jun. 4, 2020 in connection with International Patent Application No. PCT/EP2019/082515, 29 pages including English translation.

International Search Report and Written Opinion dated Jun. 4, 2020 in connection with International Patent Application No. PCT/EP2019/082518, 25 pages including English translation.

International Search Report and Written Opinion dated Jun. 4, 2021 in connection with International Patent Application No. PCT/EP2019/082257, 25 pages including English translation.

Amato et al. "A Randomized Roadmap Method for Path and Manipulation Planning," IEEE, Apr. 1996, 8 pages.

Bortoff, Scott A. "Path Planning for UAVs" Proceedings of hte American Control Conference, Jun. 2000, 5 pages.

Bounini et al. "Modified Artificial Potential Field Method for Online Path Planning Applications," IEEE Intelligent Vehicles Symposium, Jun. 11, 2017, 7 pages.

Carbone et al. "Motion and Operation Planning of Robotic Systems: Background and Practical Approaches," Jan. 2015, 42 pages.

Correll, Nikolaus. "Introduction to Autonomous Robots," V1.7, Oct. 6, 2016, 10 pages.

Gasparetto et al. "Path Planning and Trajectory Planning Algorithms: A General Overview," 2015, 26 pages.

Kavraki et al. "Probabilistic Roadmaps for Path Planning in High-Dimensional Configuration Spaces," IEEE, vol. 12, No. 4, Aug. 1996, 15 pages.

Nieuwenhuisen et al. "Local Multiresolution Path Planning in Soccer Games Based on Projected Intentions," Mar. 2012, 32 pages.

Padilla Cataneda et al. "Local Autonomous Robot Navigation using Potential Fields," Jun. 1, 2008, 25 pages.

Petereit et al. "Application of Hybrid A* to an Autonomous Mobile Robot for Path Planning in Unstructured Outdoor Environments," 2012.

Röfer et al. RoboCup 2011: Robot Soccer World Cup XV, Mar. 2012, 24 pages.

Tommasino et al. "'Feel the Painting': a Clinician-Friendly Approach to Programming Planar Force Fields for Haptic Devices," IEEE, 2015, 6 pages.

Trumper et al. "Design and Analysis Framework for Linear Permanent Magnet Machines," IEEE, 1994, 8 pages.

Velagapudi et al. "Decentralized prioritized planning in large multirobot teams," 2010 IEEE/RSJ International Conference on Intelligent Robots and Systems, Oct. 18, 2010, 7 pages.

Warren, Charles. "Multiple Robot Path Coordination Using Artificial Potential Fields," IEEE Conference on Robotics and Automation, May 13, 1990, 8 pages.

Zhang et al. "Probabilistic Roadmap with Self-learning for Path Planning of a Mobile Robot in a Dynamic and Unstructured Environment," IEEE, Aug. 4, 2013, 6 pages.

Office Action dated Dec. 24, 2021 in connection with Chinese patent application No. 201980077844.7, 10 pages including English translation.

"Flying Motion: XPlanar," Beckhoff New Automation Technology, Nov. 1, 2018, Seiten 1-28. <https://www.beckhoff.com/media/downloads/informationsmedien/beckhoff_xplanar_e.pdf>.

(56) References Cited

OTHER PUBLICATIONS

Gayle, et al. "Reactive deformation roadmaps: motion planning of multiple robots in dynamic environments." Proceedings of the 2007 IEEE/RSJ International Conference on Intelligent Robots and Systems, Oct. 29-Nov. 2, 2007, S. 3777-3787.
Kim, et al. "Probabilistic Vehicle Trajectory Prediction over 1 Recurrent Neural Network," arxiv.org, Cornell University Library, 201 Olin Library Cor 14853, Apr. 24, 2017.
Le-Anh, et al. "A review of design and control of automated guided vehicle systems," European Journal of Operational Research, 171 (2006), pp. 1-23.
Office Action dated Dec. 14, 2021 in connection with Chinese patent application No. 201980077609X, 19 pages including English translation.
Notification of an Objection received in connection with European patent application No. 19817165.4, dated Mar. 7, 2023, 41 pages including English translation.
Enze, Jiang et al. "Analysis of Current Distribution for Permanent Magnet Synchronous Planar Motors," Proceedings of the CSEE, vol. 31, No. 9, Mar. 25, 2011, 5 pages.
Kim, Won-jong et al. "Modeling and Vector Control of Planar Magnetic Levitator," IEEE, vol. 34, No. 6, Nov. 1998, 9 pages.
Translation of Chinese Publication No. CN103135640A.

\* cited by examiner

DEVICE AND METHOD FOR PREVENTING A COLLISION WHEN DRIVING AT LEAST TWO MOVERS ON A DRIVE SURFACE

CROSS-REFERENCE TO RELATED APPLICATIONS

This application is a continuation of International Patent Application PCT/EP2019/082298, "Device and Method for Preventing a Collision when Driving at Least Two Moving Elements on a Driving Surface," filed 22 Nov. 2019, which claims priority to German patent application DE 10 2018 129 727.0, "Vorrichtung and Verfahren zum Vermeiden einer Kollision beim Antreiben von wenigstens zwei Movern auf einer Antriebsfläche," filed 26 Nov. 2018, each of which is incorporated by reference herein, in the entirety and for all purposes.

FIELD

The present invention relates to a method and to a device for preventing a collision when driving at least two movers on a drive surface.

BACKGROUND

Planar drive systems may, inter alia, be used in automation technology, in particular in manufacturing technology, handling technology and process engineering. With planar drive systems, a movable element, a so-called mover, of a system of a machine may be moved or positioned in at least two linearly independent directions. Planar drive systems may comprise a permanently energized electromagnetic planar motor with a planar stator and a rotor, i.e. the mover, movable on the stator in at least two directions. Such a planar drive system is e.g. known from WO 2016012160 A1.

In a permanently energized electromagnetic planar motor, a driving force is exerted on the mover by current-carrying conductors magnetically interacting with driving magnets of a magnet arrangement. The present invention relates in particular to embodiments of planar drive devices in which the drive magnets of an electric planar motor are arranged on the mover and the current-carrying conductors of the planar motor are arranged in a stationary drive surface.

EP 3 095 739 A1 discloses a device for driving at least one mover on a drive surface, wherein travel paths are calculated in the form of paths for the movers.

SUMMARY

The invention is to provide an improved device and an improved method for preventing a collision when driving at least two movers on a drive surface.

According to one aspect, a device prevents a collision when driving at least two movers on a drive surface. Each mover comprises at least one second magnetic field generator for generating a magnetic field. The device comprises a plurality of plate-shaped sectors, the sectors each comprising at least one electric magnetic field generator for generating magnetic fields, wherein the sectors form the drive surface, wherein the sectors are connected to a control unit, wherein the control unit is embodied to generate magnetic fields via a corresponding control of a power supply of the magnetic field generators in such a way that the movers are movable in at least one direction over the drive surface, wherein the control unit is embodied to perform a first path planning for the first mover, wherein the control unit is embodied to determine or receive an estimated second travel path of the second mover, wherein the control unit is embodied to take the estimated second travel path of the second mover into account in the first path planning of the first mover in order to determine a first travel path for the first mover in such a way that a collision of the first mover with the second mover is prevented, the control unit being embodied to actuate the magnetic field generator with current in such a way that the first mover may be moved over the drive surface along the determined first travel path.

According to another aspect, a method prevents a collision when driving at least two movers on a drive surface. Each mover comprises at least one magnetic field generator. A device comprises a plurality of plate-shaped sectors, the sectors each comprising at least one electric magnetic field generator for generating magnetic fields, the sectors forming the drive surface. A first path planning for the first mover is carried out, wherein an estimated second travel path of the second mover is determined or received, wherein the estimated second travel path of the second mover is taken into account in the first path planning of the first mover to determine a first travel path for the first mover in such a way that a collision of the first mover with the second mover is prevented.

According to another aspect, a device prevents a collision when driving at least two movers on a drive surface, each mover comprising at least one magnetic field generator for generating a magnetic field. The device comprises a plurality of plate-shaped sectors, the sectors each comprising at least one electric magnetic field generator for generating magnetic fields, wherein the sectors form the drive surface, wherein the sectors are connected to a control unit. The control unit is embodied to generate magnetic fields via a corresponding control of a power supply of the magnetic field generators of the sectors in such a way that the movers are movable in at least one direction over the drive surface. The control unit is embodied to perform a path planning for the movers. The control unit is embodied to determine travel paths for the movers in such a way that a collision of movers is prevented, the control unit being embodied to actuate the magnetic field generators of the sectors with current in such a way that the movers may be moved over the drive surface along the determined travel path. The control unit is embodied, when determining a travel path for a first mover to respectively take into account estimated travel paths for the further mover, wherein in case of the risk of a collision between the movers, the travel paths of the movers are changed according to the priorities assigned to the movers, said priorities determining priority and avoidance rules, wherein only for movers having a low priority a change of their travel paths is carried out based on the estimate of the travel paths of the movers with higher priority, and wherein the estimated travel paths of the further movers are to be repeatedly determined or repeatedly received at predetermined time intervals and when determining the travel path for the first mover are to be repeatedly considered at predetermined time intervals.

EXAMPLES

An advantage of the device and method described is that with the aid of little computational effort the movement of a second mover is taken into account in the path planning of a first mover. In addition, the amount of data that has to be exchanged is smaller. For this purpose, an estimated travel path of the second mover is taken into account in the path planning of the first mover. Since a precise second travel path calculated for the future is not considered, the comparison between the estimated second travel path and the first travel path is easier to perform. The comparison of two precise travel paths involves significantly more computational effort than the comparison between a precise travel path and an estimated travel path. An inaccuracy of the second travel path, which results from estimating the second travel path, is accepted. In path planning for the first mover, a first travel path is determined. The first travel path determines the travel distance of the first mover for a predetermined time in the future.

The estimate of the second travel path may be performed by the control unit that performs the path planning for the first mover. In addition, the estimated second travel path may only be received by even the control unit, saving computational effort at the control unit. Depending on the chosen embodiment, the estimated second travel path is determined based on a current second direction of movement of the second mover. For example, this estimate may be used to check in a simple manner whether the second direction of movement of the second mover crosses the first path of movement of the first mover at all. This check may be used for a first simple estimate of a possible collision between the two movers.

In a further embodiment, in addition to the second direction of movement of the second mover, a second travel path of the second mover is determined and taken into account based on a current second speed and/or a second acceleration and/or a change in a second acceleration of the second mover. The second travel path determines the future position of the second mover. By taking the second speed of the second mover into account, it may be verified in addition to the direction of movement whether the second mover actually crosses the first travel path of the first mover at all in a foreseeable time. Furthermore, the estimated second travel path may be used to check whether a collision between the first and the second mover is likely at all. A probable collision may be assumed if the movers collide in a predetermined time frame and in a predetermined area. The probability of a collision may be influenced by several factors. One crucial factor is the time to collision. As the time to collision increases, it becomes less and less likely that the collision will occur because it becomes less and less likely that the planned or estimated travel paths will actually be followed. Other factors include the areas of overlap of the movers present in a collision, i.e. whether the movers meet fully or only touch, and possibly the angle between the speed vectors of the movers. For a simple estimate, the current speed of the second mover is sufficient. For an improved estimate, the acceleration of the second mover may also be considered in addition to the speed of the second mover. For a further improved estimate, the change in acceleration i.e. the jolt of the second mover may also be considered in addition to the acceleration of the second mover. For the collision check, the calculated first travel path of the first mover is used for the first mover.

In an embodiment, the estimated second travel path is determined based on a linear extrapolation of the current second travel path of the second mover at a constant direction of movement and/or constant speed and/or constant acceleration and/or constant jolt. This linear extrapolation then results in a simplified estimated travel path, e.g. an estimated travel path with a straight-line movement at the current direction of movement, or an estimated travel path with constant speed at the current speed, or an estimated travel path with constant acceleration at the current acceleration, or an estimated travel path with constant jolt at the current acceleration. The linear extrapolation of the current second travel path of the second mover has the advantage that, among other things, the amount of data of the estimated second travel path is considerably reduced, since the estimated second travel path may be represented analytically, i.e., with a formula, for example.

In an embodiment, the first travel path for the first mover is determined repeatedly at predetermined time intervals. Furthermore, in another embodiment, the estimated second travel path is determined or received at predetermined time intervals. Further, the estimated second travel path of the second mover is repeatedly considered at predetermined time intervals during path planning of the first travel path of the first mover. The time intervals may e.g. be in a range of 100 µs to 400 µs. Moreover, the time intervals may also be in the range of 2 ms. In this way, a continuous update is performed during the movement of the first mover and/or the second mover.

In a further embodiment, the control unit is embodied to take the estimated second travel path into account when planning the path of the first travel path if a collision of the first mover with the second mover has at least a predetermined probability within a predetermined time period. A collision may be assumed to be likely if the movers are in a predetermined area in a predetermined time range, taking into account the first travel path and the estimated second travel path. The time range and area may be chosen accordingly depending on the accuracy of the estimation. This estimate may also render unnecessary consideration of a possible collision obsolete.

In a further embodiment, the estimated second travel path is only taken into account in the path planning of the first travel path if the estimated second travel path crosses the determined first travel path within a predefined time period. In this way, computing time may be saved if no crossing of the travel paths is detected for the time period on the basis of the estimate and thus a collision may be ruled out. The predefined time period may e.g. lie within a range from 100 µs to 2 s.

In a further embodiment, an estimated first travel path of the first mover is also taken into account in the path planning of the second mover. Thus, by mutually considering the estimated travel paths, a possible collision may be detected at an early stage and the path planning of the first and/or the second mover may be changed accordingly to prevent the collision. Thus, not only the first travel path of the first mover but also the second travel path of the second mover may be changed to prevent the collision.

Analogously, a collision may also be prevented for more than two movers. For more than two movers, it makes sense to assign priorities to the movers in order to be able to use unique priority rules and avoidance rules. For example, it could be advantageous that only movers with lower priority have their travel path changed based on the estimate of the travel paths of movers with higher priority.

In one embodiment, the control unit comprises at least a first partial control unit and a second partial control unit, wherein the first path planning for the first mover is performed by the first partial control unit and the second path planning for the second mover is performed by a second partial control unit, or wherein the first path planning for the first mover is performed by a first planning program and the second path planning for the second mover is performed by a second planning program, and wherein the estimated first travel path of the first mover is determined by the first partial control unit or by the first planning program, wherein the estimated second travel path of the second mover is determined by the second partial control unit or by the second planning program, and wherein the estimated second travel path is received by the first partial control unit or by the first planning program, and wherein the estimated first travel path is received by the second partial control unit or by the second planning program. In this way, fast path planning may be performed.

A method is proposed for preventing a collision when driving at least two movers on a drive surface, each mover comprising at least one second magnetic field generator, the device comprising a plurality of plate-shaped sectors, the sectors each comprising at least one electric magnetic field generator for generating magnetic fields, the sectors forming the drive surface, wherein a first path planning is performed for the first mover, wherein an estimated second travel path of the second mover is determined or received, wherein the estimated second travel path of the second mover is taken into account in the path planning of the first mover in order to determine a first travel path for the first mover such that a collision of the movers is prevented.

In an embodiment, the magnetic field generators of the sectors are supplied with current in such a way that the first mover may be moved over the drive surface along the determined first travel path. This converts the path planning into a movement of the mover.

In another embodiment, the estimated second travel path is determined based on a current second direction of movement of the second mover. In this way, a simple estimate of the second travel path is possible.

In a further embodiment, the estimated second travel path is determined based on a current second speed and/or a second acceleration and/or a change in the second acceleration of the second mover. This allows a more accurate estimate of the second travel distance in a simple way.

In an embodiment, the estimated second travel path is determined based on a linear extrapolation of the current second travel path of the second mover with a constant second direction of movement and/or second speed and/or second acceleration and/or change in second acceleration. In this way, the estimate of the second travel path may be performed more precisely with little computational effort.

In another embodiment, the estimated second travel path of the second mover is repeatedly determined or received at predetermined time intervals and is repeatedly taken into account in the first path planning of the first travel path of the first mover at the predetermined time intervals. By repeating the first path planning, collision checks may be performed with relative precision in spite of the simple estimate of the second travel path.

In another embodiment, estimating the second travel path of the second mover and/or receiving the estimated second travel path of the second mover are repeated, wherein the first path planning of the first travel path of the first mover is repeatedly performed at time intervals of 100 µs to 2000 µs, taking into account the estimated second travel path of the second mover.

In an embodiment, the estimated second travel path is taken into account in the first path planning of the first travel path if the estimated second travel path crosses the determined first travel path within a predetermined time period, said time period being particularly in the range of 100 µs to 2 s. In this way, sufficient monitoring of a collision is achieved.

In another embodiment, the estimated second travel path is considered in the first path planning of the first travel path if a collision of the first mover and the second mover is likely to occur within a predetermined time period.

In another embodiment, a second path planning for the second mover is performed, wherein an estimated first travel path of the first mover is taken into account in the second path planning of the second mover to determine a second travel path for the second mover in such a way that a collision of the movers is prevented, and wherein in particular the magnetic field generators are supplied with power in such a way that the second mover may be moved over the drive surface along the determined second travel path.

In a further embodiment, first and second partial control units are provided, wherein the first path planning for the first mover is performed by the first partial control unit and the second path planning for the second mover is performed by the second partial control unit, or wherein the first path planning for the first mover is performed by a first planning program and the second path planning for the second mover is performed by a second planning program, and wherein the estimated first travel path of the first mover is determined by the first partial control unit or by the first planning program, wherein the estimated second travel path of the second mover is determined by the second partial control unit or by the second planning program, and wherein the estimated second travel path is received by the first partial control unit or by the first planning program, and wherein the estimated first travel path is received by the second partial control unit or by the second planning program.

A control unit is proposed which is embodied to carry out one of the described methods.

A computer program is proposed with instructions that, when run on a computer, perform one of the described procedures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention essentially relates to further developments of the planar drive systems disclosed in the publications WO 2013/059934 A1, WO 2015/017933 A1, WO 2015/179962 A1, WO 2015/184553 A1, WO 2015/188281 A1 and WO 2017/004716 A1. The disclosure content of the aforementioned publications is made the additional subject matter of the present description in its entirety by reference.

Furthermore, the invention relates to further developments of the planar drive systems disclosed in German patent applications 10 2017 131 304.4, 10 2017 131 314.1, and 10 2017 131 321.4, filed with the German Patent and Trademark Office on 27 Dec. 2017. The disclosure content of the German patent applications 10 2017 131 304.4, 10 2017 131 314.1, and 10 2017 131 321.4 is made the additional subject matter of the present description in its entirety by reference.

Figure 1:
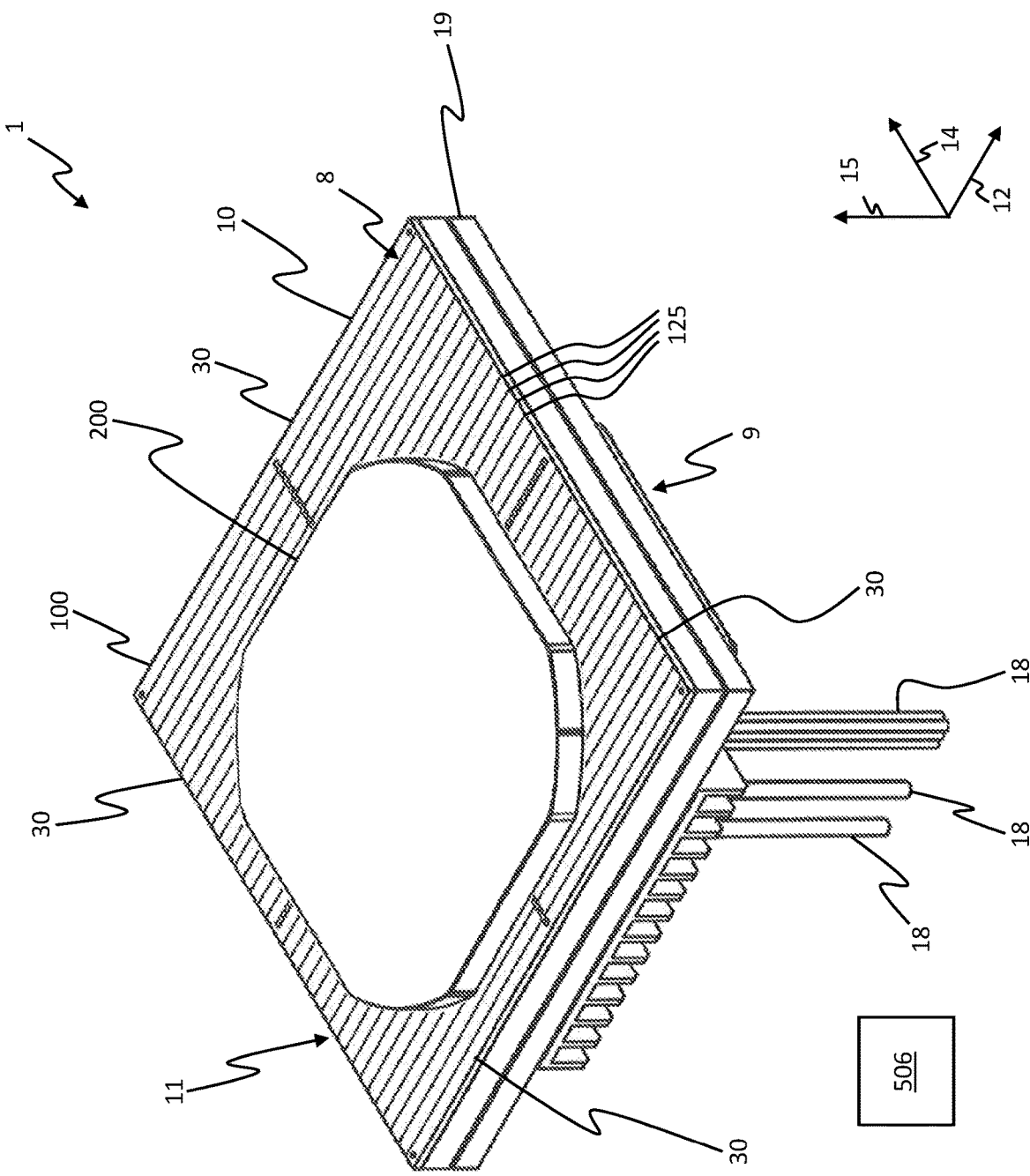
FIG. 1 shows a planar drive system for driving a mover on a drive surface.

FIG. 1 shows a device for driving at least one mover 200 on a drive surface in the form of a planar drive system 1 comprising a stator module 10 and a rotor formed by the mover 200.

The stator module 10 includes a module housing 19 and a stator assembly 100. The stator module 10 has a top side 8 and a bottom side 9 opposite the top side 8. The stator assembly 100 is arranged in a vertical direction 15 oriented from the bottom side 9 to the top side 8 above the module housing 19 and at the top side 8 of the stator module 10. The stator assembly 100 is formed as a planar stator and has a flat, i.e. planar, stator surface 11 on the upper side 8 of the stator module 10. At the same time, the stator surface 11 forms a surface of the stator module 10.

The stator surface 11 is oriented perpendicular to a vertical direction 15 and extends across the entire top surface 8 of the stator assembly 100 and the stator module 10 along directions 12 and 14. The stator assembly 100 includes at least one conductor strip 125 on the stator surface 11, to which a drive current may be applied. As shown, the stator assembly 100 may include a plurality of the conductor strips 125 on the stator surface 11. A drive current may be applied to each of the conductor strips 125 by a control unit 506. With the drive currents in the conductor strips 125, a magnetic field may be generated that drives the mover 200 in interaction with drive magnets of the mover 200. The mover 200 and the stator assembly 100 with the current-carrying conductor strips 125 form an electromagnetic planar motor. The conductor strips 125 form coil conductors of the stator assembly 100 and may also be referred to as coil conductors.

During operation, the mover 200 is movably arranged above the stator surface 11 of the stator module 10 and, when operated, may be driven in a first direction 12 as well as in a second direction 14. The first direction 12 and the second direction 14 are linearly independent. In particular, the first direction 12 and the second direction 14 may be oriented perpendicularly with regard to each other, as shown in FIG. 1. The first direction 12 and the second direction 14 are each oriented in parallel to the stator surface 11 and perpendicular to the vertical direction 15. By driving the mover 200 in both the first direction 12 and the second direction 14, the mover 200 may be driven in any direction above the stator surface 11. In operation, the mover 200 may be held floating above the stator surface 11, e.g. by magnetic interaction between the drive magnets and suitable drive currents in the conductor strips 125. In addition to driving the mover 200 in the first and/or second directions 12, 14, it is also possible to drive it in the third, vertical direction 15. Furthermore, the mover 200 may also be rotated about its axis. The conductor strips represent conductor paths.

The stator surface 11 is rectangular in shape. In particular, the stator surface 11 may be square in shape, as shown. The stator surface 11 is limited by four respective straight outer edges 30. In each case, two mutually opposite outer edges 30 are oriented in parallel to the first direction 12 and two mutually opposite further outer edges 30 are oriented in parallel to the second direction 14.

An extension of the stator assembly 100 in the vertical direction 15 is smaller than an extension of the stator assembly 100 in the first and second directions 12, 14. Therefore, the stator assembly 100 forms a flat cuboid extending in the first and second directions 12, 14 or a plate extending in the first and second directions 12, 14.

Further components may be arranged at the module housing 19 or at the stator module 10 on the bottom side 9 of the stator module 10 or on the bottom side of the module housing 19. These further components extend at most to the outer edges 30 of the stator assembly 100 in the first direction 12 or in the second direction 14, so that the further components do not project beyond the outer edges 30 of the stator assembly 100 in the first or the second direction 12, 14.

Connections for connecting the stator module 10 to a plurality of connecting lines 18 are arranged on the bottom side of the module housing 19. The connecting lines 18 may e.g. comprise an input line of a data network, an output line of the data network, and a power supply line for supplying electrical power to the stator module 10. In addition, a control unit 506 may be connected to a connecting line 18. In particular, electrical power may be supplied to the stator module 10 via the power supply line to generate the drive currents. Via the data network, the stator module 10 may be connected to a control unit of the planar drive system, wherein the control unit of the planar drive system may be the control unit 506. With the data network, for example, control data for controlling the mover 200 or for controlling the targeted application of suitable drive currents to the conductor strips may be exchanged with the control unit 506.

In the first direction 12, the stator surface 11 may have an extension of between 100 mm and 500 mm, in particular between 120 mm and 350 mm, in particular of 240 mm. In the second direction 12, the stator surface 11 may have an extension of between 100 mm and 500 mm, in particular of between 120 mm and 350 mm, in particular of 240 mm. In the vertical direction 15, the stator module 10 may have an extension of between 10 mm and 100 mm, in particular of between 15 mm and 60 mm, in particular of 30 mm. In the vertical direction 15, the module housing 19 may have an extension of between 8 mm and 80 mm, in particular of between 13 mm and 55 mm, in particular of 26.6 mm. The module housing 19 may have the same extension in the first and/or second direction 12, 14 as the stator surface 11.

Figure 2:
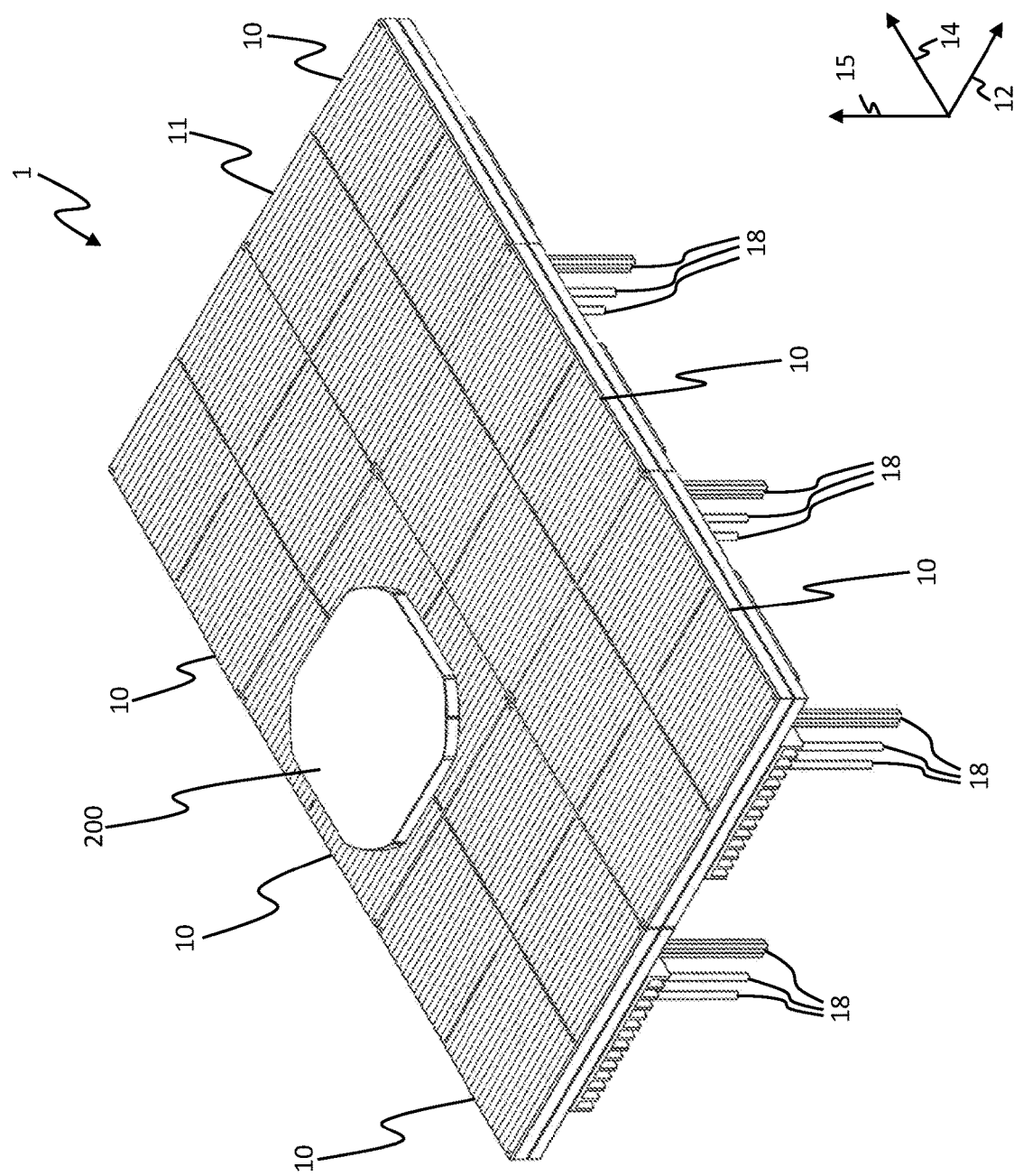
FIG. 2 shows a view of another drive system having six stator modules arranged side by side.

Multiple specimens of the stator module 10 may be arranged adjacent to each other in such a way that the outer edges 30 of adjacent stator modules 10 adjoin on one another and the stator surfaces 11 of the stator modules 10 form a continuous drive surface over which the mover 200 may be moved without interruption, as shown in FIG. 2. Since the side surfaces of the stator module 10 are flush with the stator surface 11 at the outer edges 30, the stator surfaces 11 of two adjacent stator modules 10 may be arranged almost seamlessly adjoining each other by arranging the stator modules 10 with adjoining side surfaces of the stator assemblies 100 or adjoining outer edges 30 of the stator surfaces 11.

Adjacent stator modules 10 are each arranged adjacent to each other such that the outer edges 30 of the stator surfaces 11 of adjacent stator modules 10 adjoin on one another. As a result, the stator surfaces 11 of the stator modules 10 form a continuous, planar drive surface for the mover 200. The mover 200 may be moved seamlessly from the stator surface 11 of one of the stator modules 10 onto or over the stator surface 11 of the adjacent stator module 10. Control signals and/or power may be supplied to each of the stator modules 10 via respective associated connecting lines 18. Alternative embodiments of the stator modules 10 may also include electrical connecting elements by which control signals and/or electrical power may be transmitted from one stator module 10 to the adjacent stator module 10. Such connecting elements may e.g. be arranged on the side surfaces of the stator modules 10. The connecting elements may be embodied as connectors or as contact surfaces that may be arranged adjoining one another.

In alternative embodiments, the stator modules 10 may also be connected to a central power supply device and/or a central control unit in a star configuration, each via their own connecting lines.

Figure 3:
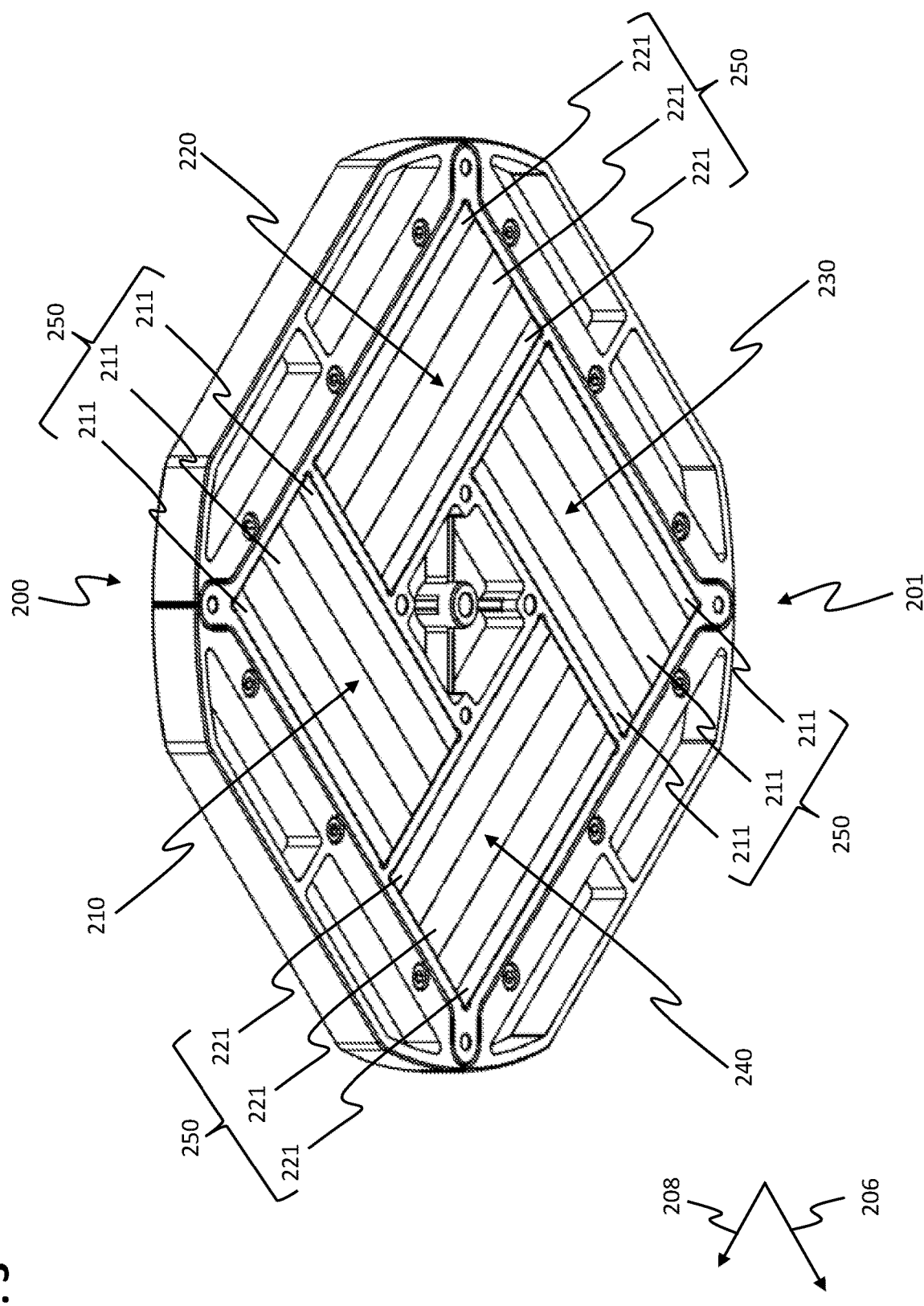
FIG. 3 shows the mover of the planar drive system shown in FIG. 1 with a magnet arrangement.

FIG. 3 shows the rotor, i.e. the mover 200, in a view from below onto a bottom side of the mover 200. The mover 200 comprises a magnet arrangement 201 on the bottom side. The magnet arrangement 201 is rectangular, in particular square, in shape and comprises a plurality of magnets. The bottom side of the mover 200 is flat or planar, in particular in the area of the magnets of the magnet arrangement 201. In operation, the bottom side of the mover 200 comprising the magnet arrangement 201 is essentially oriented in parallel to the stator surface 11 and is arranged facing the stator surface 11.

The magnet arrangement 201 includes a first magnet unit 210, a second magnet unit 220, a third magnet unit 230, and a fourth magnet unit 240. The first magnet unit 210 and the third magnet unit 230 each comprise drive magnets 211 extending in an elongated manner in a first rotor direction 206 and arranged side by side along a second rotor direction 208 oriented perpendicularly with regard to the first rotor direction 206. In particular, the first and third magnet units 210, 230 may each have three drive magnets 211. The second magnet unit 220 and the fourth magnet unit 240 each have further drive magnets 221 arranged side by side in the first rotor direction 206 and extending in an elongated manner along the second rotor direction 208. In operation, the first and third magnet units 210, 230 serve to drive the mover 200 in the second rotor direction 208, and the second and fourth magnet units 220, 240 serve to drive the mover 200 in the first rotor direction 206. The drive magnets 211 of the first and third magnet units 210, 230 and the further drive magnets 221 of the second and fourth magnet units 220, 240 are respectively magnetized perpendicular with regard to the first and second rotor directions 206, 208.

The drive magnets 211 and/or further drive magnets 221 represent second magnetic field generators 250. The second magnetic field generators 250 may also have other materials, functional principles and/or shapes.

Figure 4:
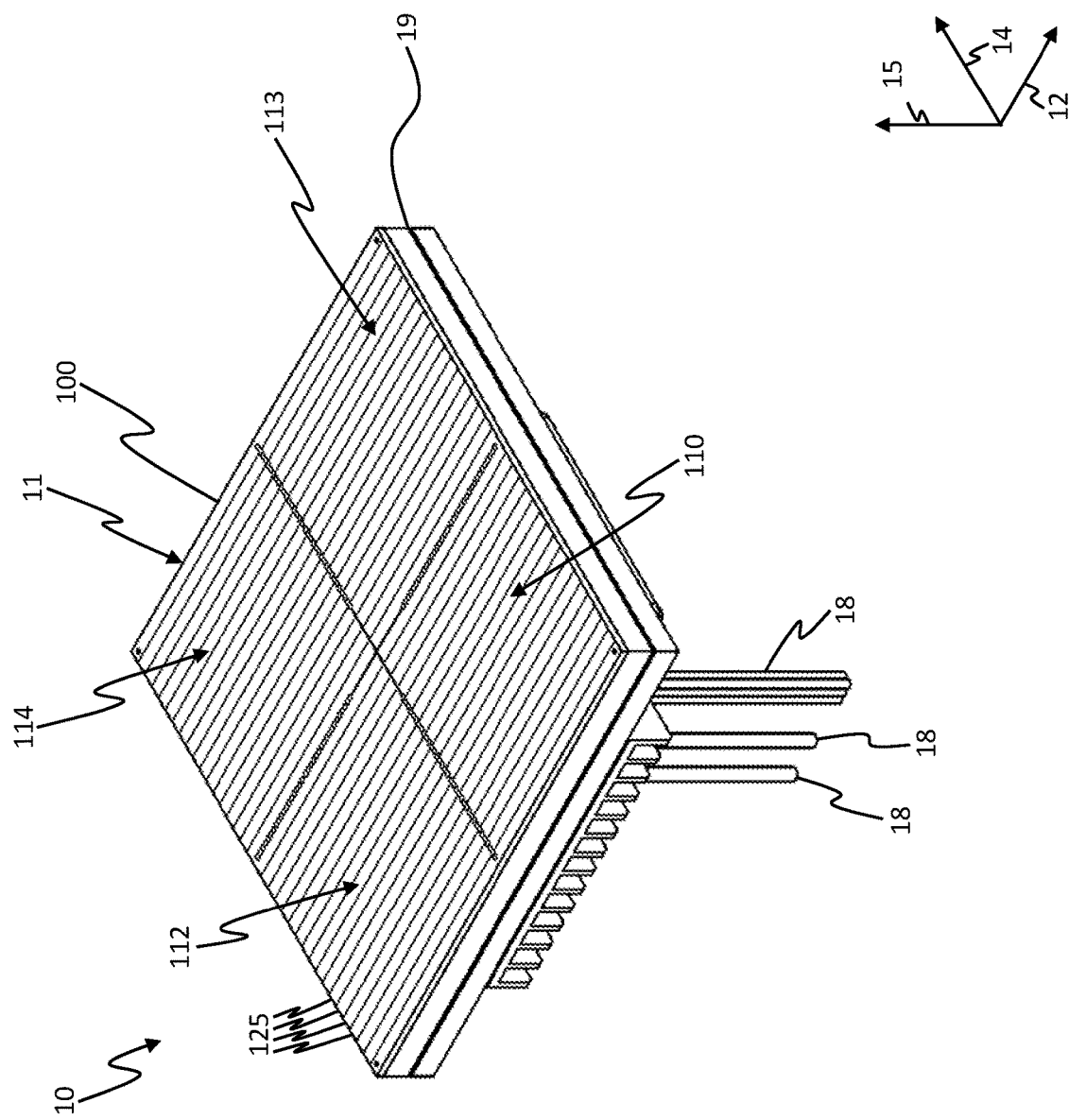
FIG. 4 shows a perspective view of a part of the drive system according to FIG. 1.

FIG. 4 shows the stator module 10 of the planar drive system 1 in a perspective view without the mover 200. The stator assembly 100 of the stator module 10 comprises a first stator sector 110, a second stator sector 112, a third stator sector 113, and a fourth stator sector 114. The stator sectors 110, 112, 113, 114 each in turn comprise a portion of conductor strips 125 disposed on the stator surface 11 of the stator assembly 100. Each of the conductor strips 125 on the stator surface 11 is arranged entirely within one of the stator sectors 110, 112, 113, 114. The stator sectors 110, 112, 113, 114 are rectangular in shape. In particular, the stator sectors 110, 112, 113, 114 may be square in shape such that an extension of the stator sectors 110, 112, 113, 114 in the first direction 12 corresponds to an extension of the stator sectors 110, 112, 113, 114 in the second direction 14.

The stator sectors 110, 112, 113, 114 each comprise a quarter of the area, i.e., a quadrant, of the stator assembly 100.

Within the stator sectors 110, 112, 113, 114, the conductor strips 125 are arranged in a plurality of stator layers or stator planes arranged on top of one another, each of the stator layers comprising only conductor strips 125 either essentially extending in an elongated manner along either the first direction 12 or essentially along the second direction 14. Apart from the extension of the conductor strips 125, and unless differences are described in the following, the stator sectors 110, 112, 113, 114 are formed identically on the different stator layers. In the stator assembly 100 of the stator module 10 shown in FIG. 4, the stator layer on the stator surface 11 comprises only conductor strips 125, which extend in an elongated manner along the first direction 12 and are arranged side by side and adjoining one another along the second direction 14.

The stator layer visible in FIG. 4 at the stator surface 11 forms a first stator layer of the stator assembly 100. In the vertical direction 15 below the first stator layer, the stator assembly 100 comprises at least one more second stator layer.

Figure 5:
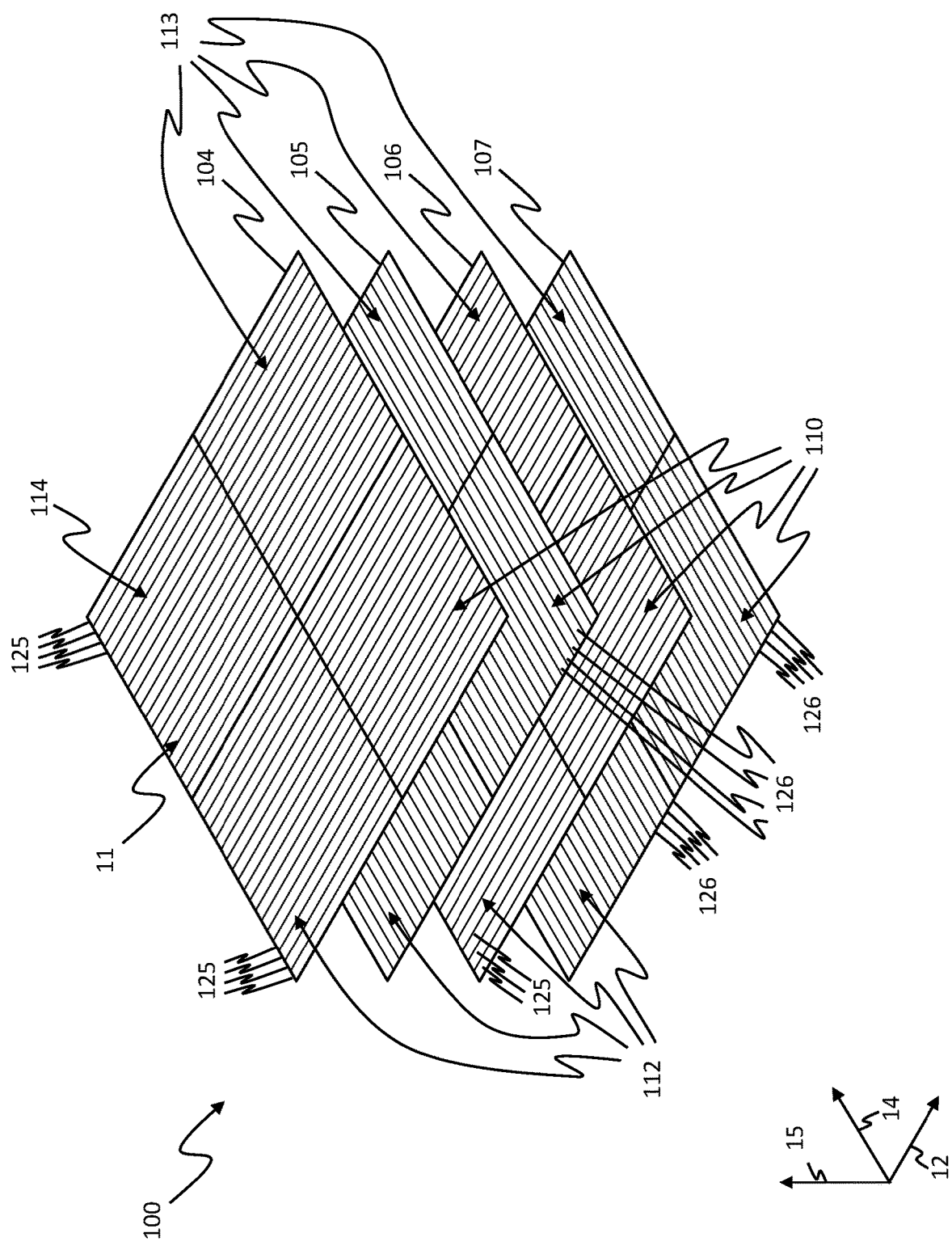
FIG. 5 shows an exploded view of a sector of the drive system shown in FIG. 1 with a first, second, third and fourth stator layer.

FIG. 5 shows a schematic perspective depiction of an exploded view of the stator assembly 100 with the individual stator layers.

In the vertical direction 15, the stator assembly 100 comprises a second stator layer 105 below the first stator layer 104 arranged on the stator surface 11, a third stator layer 106 below the second stator layer 105, and a fourth stator layer 107 below the third stator layer 106. Unless differences are described in the following, the second, third, and fourth stator layers 105, 106, 107 are formed like the first stator layer 104 on the stator surface 11 of the stator assembly 100 shown in FIG. 4.

In the third stator layer 106, as in the first stator layer 104, the first to fourth stator sectors 110, 112, 113, 114 comprise conductor strips 125 extending in an elongated manner along the first direction 12 and arranged side by side and adjoining one another in the second direction 14. In the second stator layer 105 and in the fourth stator layer 107, the first to fourth stator sectors 110, 112, 113, 114 comprise further conductor strips 126. Unless differences are described in the following, the further conductor strips 126 are formed like the conductor strips 125 in the first stator layer 104 and in the third stator layer 106. Unlike the conductor strips 125 of the first and third stator layers 104, 106, the further conductor strips 126 of the second and fourth stator layers 105, 107 extend in an elongated manner along the second direction 14 and are arranged side by side and adjoining one another in the first direction 12.

In the first and third stator layers 104, 106, the first to fourth stator sectors 110, 112, 113, 114 exclusively comprise the conductor strips 125 extending in an elongated manner along the first direction 12 and not additionally the further conductor strips 126 extending in an elongated manner along the second direction 14. Similarly, in the second and fourth stator layers 105, 107, the first to fourth stator sectors 110, 112, 113, 114 exclusively comprise the further conductor strips 126 extending in an elongated manner along the second direction 14 and not additionally the conductor strips 125 extending in an elongated manner along the first direction 12.

The first to fourth stator sectors 110, 112, 113, 114 each have the same dimensions in all first to fourth stator layers 104, 105, 106, 107. In particular, the first to fourth stator sectors 110, 112, 113, 114 each have the same dimensions in all first to fourth stator layers 104, 105, 106, 107 in the first direction 12 and in the second direction 14.

The conductor strips 125 and the further conductor strips 126 of first to fourth stator layers 104, 105, 106, 107 arranged on top of one another are each embodied to be electrically insulated from one another. For example, the first to fourth stator layers 104, 105, 106, 107 may each be formed as mutually insulated conductor path layers of a multi-layer printed circuit board.

The first to fourth stator sectors 110, 112, 113, 114 are embodied to be energizable independently from one another. In particular, the conductor strips 125 and the further conductor strips 126 of the first to fourth stator sectors 110, 112, 113, 114 are embodied on the stator assembly 100 to be electrically insulated from one another.

While the conductor strips 125 and the further conductor strips 126 of the individual first to fourth stator sectors 110, 112, 113, 114 on the stator assembly 100 are each embodied to be electrically isolated from the conductor strips 125 and the further conductor strips 126 of the remaining first to fourth stator sectors 110, 112, 113, 114, the conductor strips 125 and further conductor strips 126 within the individual first to fourth stator sectors 110, 112, 113, 114 may each be electrically conductively connected to one another. In particular, within each of the first to fourth stator sectors 110, 112, 113, 114, stacked conductor strips 125 of the first stator layer 104 and the third stator layer 106 may be electroconductively connected to one another. For example, respective conductor strips 125 of the first to fourth stator sectors 110, 112, 113, 114 arranged on top of one another may be connected in series. Similarly, within each of the first to fourth stator sectors 110, 112, 113, 114, further conductor strips 126 of the second stator layer 105 and the fourth stator layer 107 may be electrically conductively interconnected. For example, further conductor strips 126 of the first to fourth stator sectors 110, 112, 113, 114 arranged on top of one another may be connected in series.

Alternative embodiments of the stator assembly 100 may comprise further stator layers arranged one below the other between the second and third stator layers 105, 106 in the vertical direction 15. In this context, the stator assembly 100 may in the vertical direction 15 in each case comprise alternating stator layers having conductor strips 125 essentially extending in an elongated manner along the first direction 12 and stator layers with further conductor strips 126 essentially extending in an elongated manner along the second direction 14. In an alternative embodiment, the stator assembly 100 may in the vertical direction 15 comprise respective stator layers having conductor strips 125 essentially extending in an elongated manner along the first direction 12 and stator layers having further conductor strips 126 essentially extending in an elongated manner along the second direction 14, wherein the sum of the stator layers having conductor strips 125 essentially extending in an elongated manner along the first direction 12 and the sum of the stator layers having further conductor strips 126 essentially extending in an elongated manner along the second direction 14 have an equal mean distance from the stator surface 11. Furthermore, in alternative embodiments of the stator assembly 100, further stator layers with conductor strips 125 extending in an elongated manner along the first direction 12 or with further conductor strips 126 extending in an elongated manner along the second direction 14 may be arranged between the first and the second stator layers 104, 105 and/or between the third and the fourth stator layers 106, 107.

The conductor strips 125, 126 of the first through fourth stator sectors 110, 112, 113, 114 are respectively combined into stator segments within the first through fourth stator layers 104, 105, 106, 107.

Figure 6:
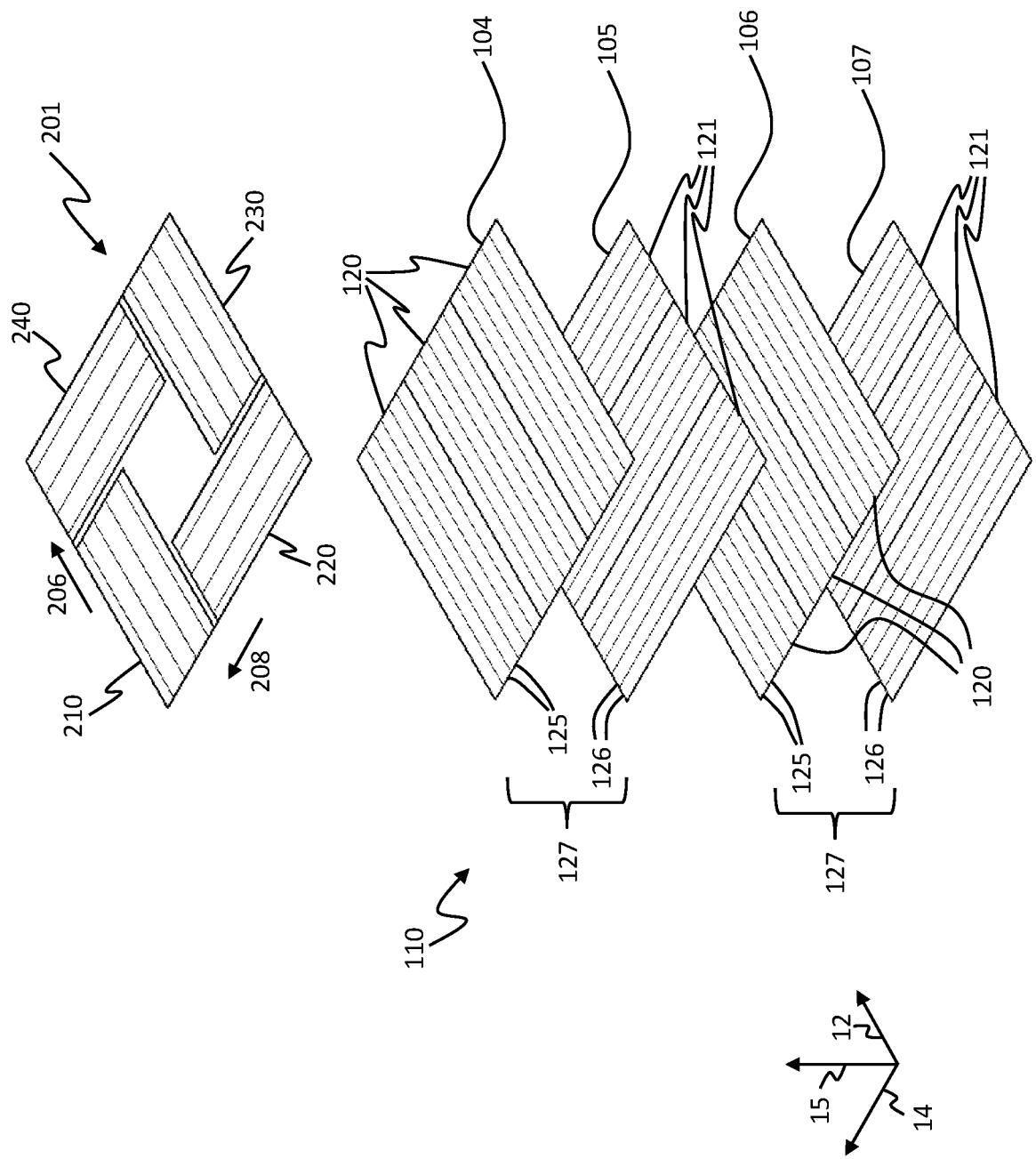
FIG. 6 shows the stator layers of the first sector of the device shown in FIG. 5 with individual stator segments.

FIG. 6 shows a schematic depiction of the first to fourth stator layers 104, 105, 106, 107 of the first stator sector 110 with the individual stator segments.

The conductor strips 125 and further conductor strips 126 of the first stator sector 110 are combined into stator segments 120, 121 within each of the first to fourth stator layers 104, 105, 106, 107. In each of the first to fourth stator layers 104, 105, 106, 107, the first stator sector 110 comprises three stator segments 120, 121 arranged side by side and adjoining one another. Each of the stator segments 120, 121 comprises six conductor strips 125 or further conductor strips 126 arranged side by side. The first stator sector 110 comprises three first stator segments 120 in each of the first and third stator layers 104, 106 and three second stator segments 121 in each of the second and fourth stator layers 105, 107. The first stator segments 120 each comprise six adjacent ones of the conductor strips 125 arranged side by side along the second direction 14 and extending in an elongated manner along the first direction 12, and the second stator segments 121 each comprise six adjacent ones of the further conductor strips 126 arranged side-by-side along the first direction 12 and extending in an elongated manner along the second direction 14.

Thus, in the first stator layer 104 and in the third stator layer 106, the first stator sector 110 of the stator assembly 100 exclusively comprises conductor strips 125 in an elongated manner along the first direction 12, and, in the second stator layer 105 and in the fourth stator layer 107, exclusively further conductor strips 126 in an elongated manner along the second direction 14.

The first and second stator segments 120, 121 have identical dimensions except for their orientation. In particular, the dimensions of the first stator segments 120 in the first direction 12 correspond to the dimensions of the second stator segments 121 in the second direction 14, and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and third stator layers 104, 106 of the first stator sector 110 extends in the first direction 12 over the three second stator segments 121 of the second and fourth stator layers 105, 107 of the first stator sector 110 that are arranged side by side to one another in the first direction 12. Further, the second stator segments 121 of the second and fourth stator layers 105, 107 of the first stator sector 110 extend in the second direction 14 over all of the first stator segments 120 of the first and third stator layers 104, 106 of the first stator sector 110 that are arranged side by side to one another in the second direction 14.

The arrangement of the conductor strips 125 and further conductor strips 126 in the first to fourth stator layers 104, 105, 106, 107 of the second stator sector 112, the third stator sector 113 and the fourth stator sector 114 corresponds to the arrangement of the conductor strips 125 and further conductor strips 126 in the first to fourth stator layers 104, 105, 106, 107 of the first stator sector 110 shown in FIG. 6.

When operating the planar drive system 1, the mover 200 may be aligned over the stator assembly 100 such that the first rotor direction 206 is oriented along the first direction 12 and the second rotor direction 208 is oriented along the second direction 14. In operation, the first magnet unit 210 and the third magnet unit 230 may interact with the magnetic field generated by the conductor strips 125 of the first stator segments 120 to drive the mover 200 along the second direction 14. The second magnet unit 220 and the fourth magnet unit 240 may in operation interact with the magnetic field generated by the further conductor strips 126 of the second stator segments 121 to drive the mover 200 along the first direction 12.

Alternatively, other than shown in FIG. 6, the mover 200 may be oriented such that the first rotor direction 206 is oriented along the second direction 14 and the second rotor direction 208 is oriented along the first direction 12. In this case, the first and third magnetic units 210, 230 interact with the magnetic field of the second stator segments 121 to drive the mover 200 in the first direction 12 and the second and fourth magnetic units 220, 240 interact with the magnetic field of the first stator segments 120 to drive the mover 200 in the second direction 14.

The conductor strips 125 or further conductor strips 126 of the individual first or second stator segments 120, 121 may each be supplied with the drive currents independently of the conductor strips 125 or further conductor strips 126 of the remaining first or second stator segments 120, 121. In particular, the drive currents in one of the first or second stator segments 120, 121 do not necessarily depend on drive currents in one of the other first or second stator segments 120, 121. Furthermore, the conductor strips 125 or further conductor strips 126 of one of the first or second stator segments 120, 121 may be energized with drive currents while the conductor strips 125 or further conductor strips 126 of another, for example an adjacent, first or second stator segment 120, 121 are without current. The conductor strips 125 or further conductor strips 126 of the individual first or second stator segments 120, 121 are electrically isolated from the conductor strips 125 or further conductor strips 126 of the remaining first or second stator segments 120, 121 on the stator assembly 100. The conductor strips 125 or further conductor strips 126 of different first or second stator segments 120, 121 may e.g. be supplied with the drive currents from respective separate power modules or from separate power generation units or output stages of a power module of the stator module 10.

The conductor strips 125 or further conductor strips 126 in the individual first to fourth stator sectors 110, 112, 113, 114 may each be interconnected to form multi-phase systems with a shared neutral point. The neutral point may be formed on the stator assembly 100. In particular, the conductor strips 125 or further conductor strips 126 may be interconnected to form three-phase systems with a shared neutral point. The three-phase systems may each comprise six adjacent conductor strips 125 or six adjacent further conductor strips 126. The number of adjacent conductor strips 125 or further conductor strips 126 in one of the three-phase systems may also be three, twelve or another multiple of three in each case.

The multiphase systems may be contactable on the stator assembly 100 in such a way that each of the multi-phase systems may be supplied with a drive current independently of the other multiphase systems. Alternatively, two or more of the multiphase systems may each be connected to one another on the stator assembly 100 such that a common drive current is jointly applied to each of the connected multiphase systems. For example, the connected multiphase systems on the stator assembly 100 may be connected in series or in parallel.

If the conductor strips 125 or further conductor strips 126 are interconnected to form multiphase systems, fewer contacts are required for energizing the conductor strips 125 or further conductor strips 126 than when separately energizing the individual conductor strips 125 or further conductor strips 126. This reduces the amount of hardware required for energizing the conductor strips 125 or further conductor strips 126, in particular the number of power-generating units required for energization.

The first to fourth stator sectors 110, 112, 113, 114 may each include eighteen conductor strips 125 or further conductor strips 126 in each of the first through fourth stator layers 104, 105, 106, 107, as shown in FIGS. 4 and 5. Six adjacent conductor strips 125 or further conductor strips 126 may each be interconnected to form a three-phase system, and the first to fourth stator sectors 110, 112, 113, 114 may each comprise three three-phase systems side by side in the first direction 12 and three three-phase systems arranged side by side in the second direction 14. In this regard, conductor strips 125 or further conductor strips 126, which are essentially extended in the same direction 12, 14 and are positioned on top of one another in the first to fourth stator layers 104, 105, 106, 107, may be connected in series to form a common three-phase system. The conductor strips 125 or further conductor strips 126 may thereby be connected in such a way that conductor strips 125 or further conductor strips 126 positioned on top of one another in the vertical direction 15 are each supplied with the same drive current. The three-phase systems thus have three phases which are interconnected through conductor strips 125 or further conductor strips 126 positioned on top of one another in the first to fourth stator layers 104, 105, 106, 107.

For example, in each of the individual first to fourth stator layers 104, 105, 106, 107, all conductor strips 125 or further conductor strips 126 positioned on top of one another and aligned in parallel may be connected in series. In particular, the conductor strips 125 of three-phase systems positioned on top of one another in the first stator layer 104 and in the third stator layer 106, and the further conductor strips 126 of three-phase systems positioned on top of one another in the second stator layer 105 and in the fourth stator layer 107 may each be connected in series to form a shared three-phase system. Thereby, all conductor strips 125 or further conductor strips 126 of the first and third stator layers 104, 106 and of the second and fourth stator layers 105, 107 which are positioned on top of one another in the vertical direction 15 and oriented in parallel may be connected in series.

In particular, in the stator assembly 100 within the individual stator segments 120, the conductor strips 125 extending in an elongated manner along the first direction 12 are each connected to form multiphase systems with a shared neutral point. In this case, the individual multiphase systems of different stator segments 120 may each be energized independently of one another. Similarly, all further conductor strips 126 of the individual further stator segments 121 are each connected to form further multiphase systems. The individual further multiphase systems of the further stator segments 121 may each be supplied with current independently of one another and independently of the multiphase systems of the stator segments 120. In particular, the conductor strips 125 of the stator segments 120 and the further conductor strips 126 of the further stator segments 121 are each connected to form three-phase systems. A three-phase drive current may be applied to each of the conductor strips 125 and the further conductor strips 126. The drive currents comprise a first phase U, a second phase V and a third phase W, each having a phase offset of 120° with regard to one another.

The conductor strips 125 are spatially offset in the second direction 14 by in each case one third of the effective wavelength of the drive magnets 211 of the first and third magnet units 210, 230 interacting with the conductor strips 125. The further conductor strips 126 are arranged spatially offset in the first direction 12 by in each case one third of the effective further wavelength of the further drive magnets 221 of the second and fourth magnet units 220, 240 interacting with the further conductor strips 126.

The conductor strips 125 and the further conductor strips 126 represent magnetic field generators 127. The magnetic field generators 127 may also comprise other materials, functional principles and/or forms.

The mover represents the movable element, i.e. the rotor of the device and comprises means for generating a magnetic field, in particular magnets or permanent magnets, referred to as second magnetic field generator. The magnetic field of the mover, together with the variable magnetic field of the stator assembly generated by the magnetic field generator 127, ensures that the mover is moved over the stator assembly so that, in particular, an air gap is formed between the stator assembly and the mover.

Figure 7:
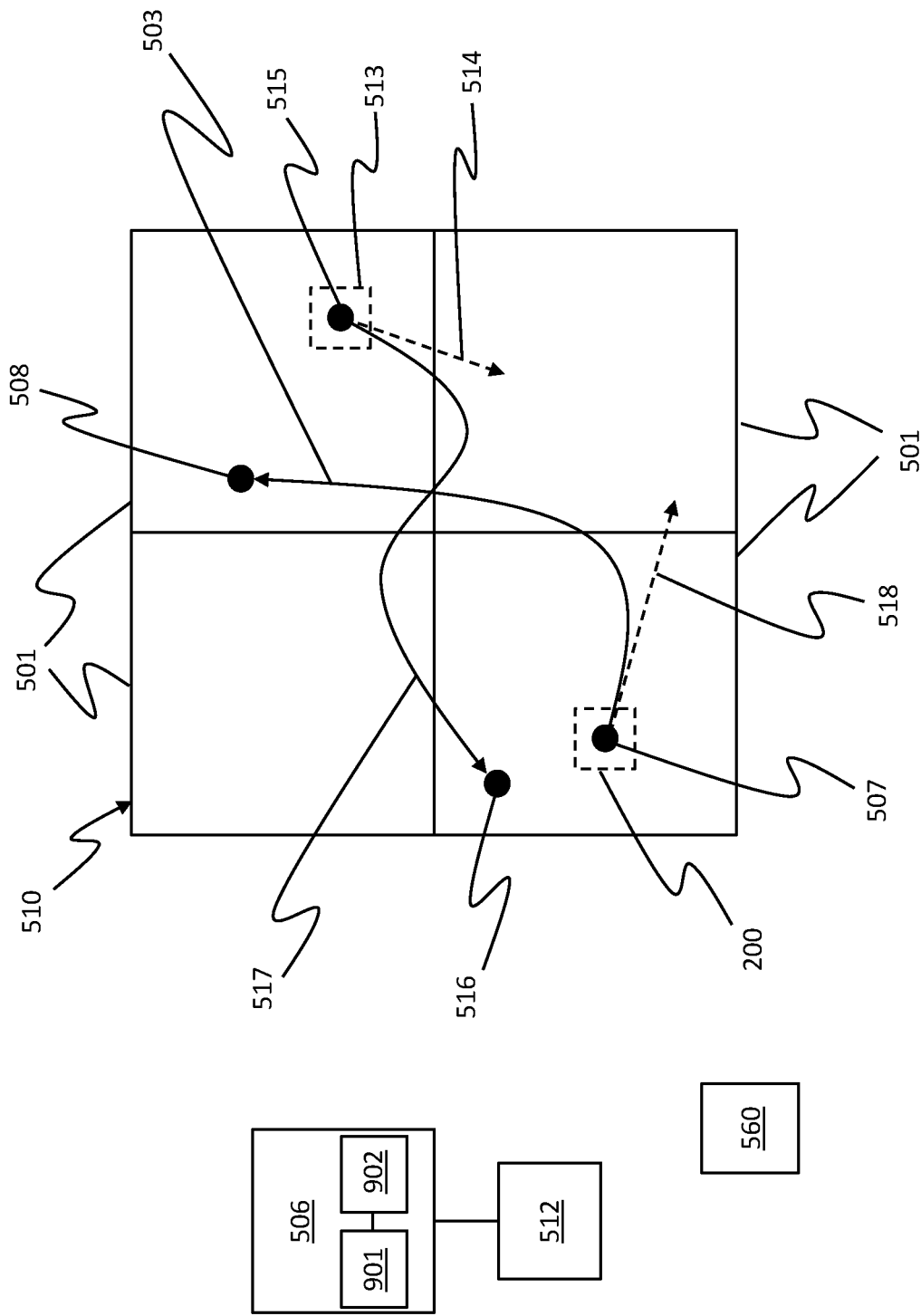
FIG. 7 shows a partial section of a drive surface on which two movers move at a first point in time, and a control unit.

FIG. 7 shows a schematic view of a section of a drive surface 510 in a top view. The drive surface 510 may be formed by a plurality of stator modules 10 of the planar drive system described in FIGS. 1 to 6. However, other embodiments of planar drive systems that use magnetic fields to move a mover 200 on a drive surface 510 may be used, as well. Four sectors 501 are shown, wherein each sector 501 may be formed by a stator module 10 of FIGS. 1 to 6. In the embodiment example, the four sectors 501 have the shape of squares. Depending on the chosen embodiment, the sectors 501 may also have other shapes, such as rectangles or triangles, etc. For example, a sector 501 may have a size in the range of 150 mm×150 mm up to 240 mm×240 mm. Depending on the chosen embodiment, a sector 501 may also have other sizes. In addition, sectors 501 may also have different sizes.

In addition, a first mover 200 and a second mover 513 are arranged on the drive surface 510. For example, the first mover 200 is embodied as described in FIGS. 1 to 3. The first mover 200 may have a square shape, a round shape, a rectangular shape, or other shapes. For example, the first mover 200 may have a size in the range of 100 mm×100 mm up to 200 mm×200 mm. The first mover 200 may have a thickness in the range of 8 mm to 20 mm. The drive surface 510, i.e., the sectors 501, and the first mover 200 may be embodied to move the first mover 200 at a speed of e.g. 1 m/s to 6 m/s. The drive surface 510, i.e., the sectors 501, and the first mover 200 may be embodied to move the first mover 200 with an acceleration of up to 30 m/s$^2$ or more. Moreover, the first mover 200 may be embodied to support a load of up to 1.5 kg or more. In addition, the first mover 200 may be embodied to be moved with a distance from the drive surface 510 of up to 6 mm or more. The second mover 513 may be embodied identically to the first mover 200.

The control unit 506 is connected to a data memory 512 and is directly or indirectly connected to magnetic field generators 127 of the sectors 501. In addition, the control unit 506 is connected to sensors 560 of the drive surface 510 that e.g. detect a current position of the first and second mover 200, 513, a current speed of the first and second mover 200, 513, a current acceleration of the first and second mover 200, 513, a current direction of movement of the first or second mover 200, 513, and/or a current jolt of the first or second mover 200, 513, and transmit this information to the control unit 506. In addition, the control unit 506 may have stored in a data memory 512 information about planned or calculated positions of the first and second mover 200, 513, calculated values for speeds of the first and second mover 200, 513, calculated values for accelerations of the first and second mover 200, 513, calculated values for directions of movement of the first and second mover 200, 513, and/or calculated values for the jolt of the first and second mover 200, 513.

The first mover 200 is to be moved along a first travel path 503 from a first starting point 507 to a first target point 508. The first travel path 503 comprises a first path and information about at which time the first mover 200 is at which position of the first path. For a simple depiction of the first travel path 503, only an arrow is shown for the first path. In addition, a current first direction of movement 518 is shown as a dashed arrow for the first mover 200.

The second mover 513 is to be moved along a second travel path 517 from a second starting point 515 to a second target point 516. The second travel path 517 comprises a second path and information about the time at which the second mover 513 is at which position of the second path. For a simple depiction of the second travel path 517, only an arrow is shown for the second path. In addition, a current second direction of movement 514 is shown as a dashed arrow for the second mover 513.

Figure 8:
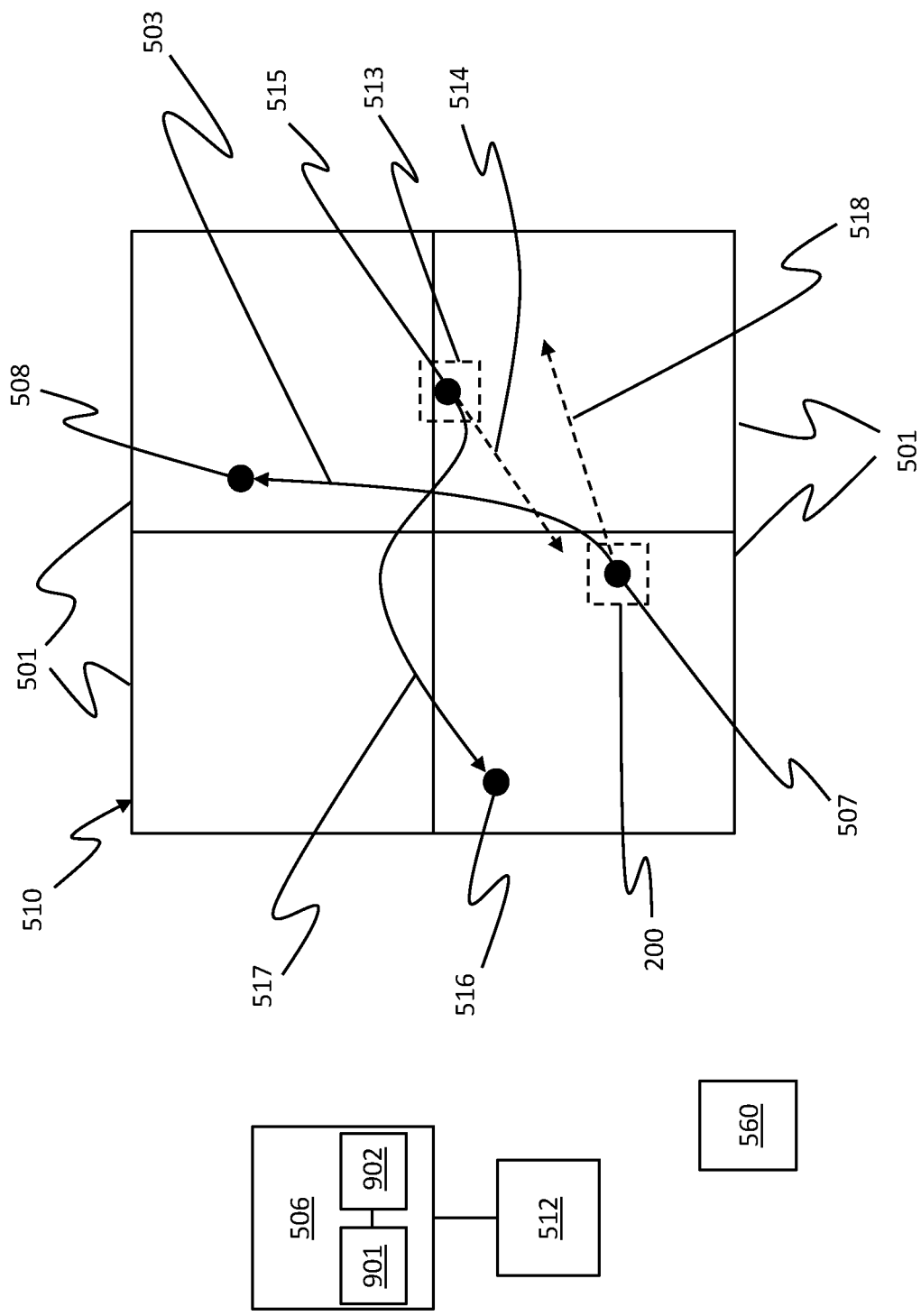
FIG. 8 shows the partial section of a drive surface according to FIG. 7, on which two movers move at a second point in time.

FIG. 8 shows the same situation as in FIG. 7 at a later point in time. The first mover 200 has been moved a little along the first travel path 503. Due to the changed position of the first mover 200 and the traveled first travel path 503, the current first direction of movement 518 of the first mover 200 has changed accordingly. The first starting point 507 always corresponds to the current position of the first mover 200, since the first starting point 507 is taken into account in the first path planning of the first mover 200 described below. The second mover 513 was also moved a distance along the second travel path 517. Due to the changed position of the second mover 513 and the traveled second travel path 517, the current second direction of movement 514 of the second mover 513 has also changed accordingly. Here, the second direction of movement 514 of the second mover 513 crosses the first travel path 503 of the first mover 200. The second starting point 515 always corresponds to the current position of the second mover 513, since the second starting point 515 is taken into account in the second path planning of the second mover 513 described below.

Figure 9:
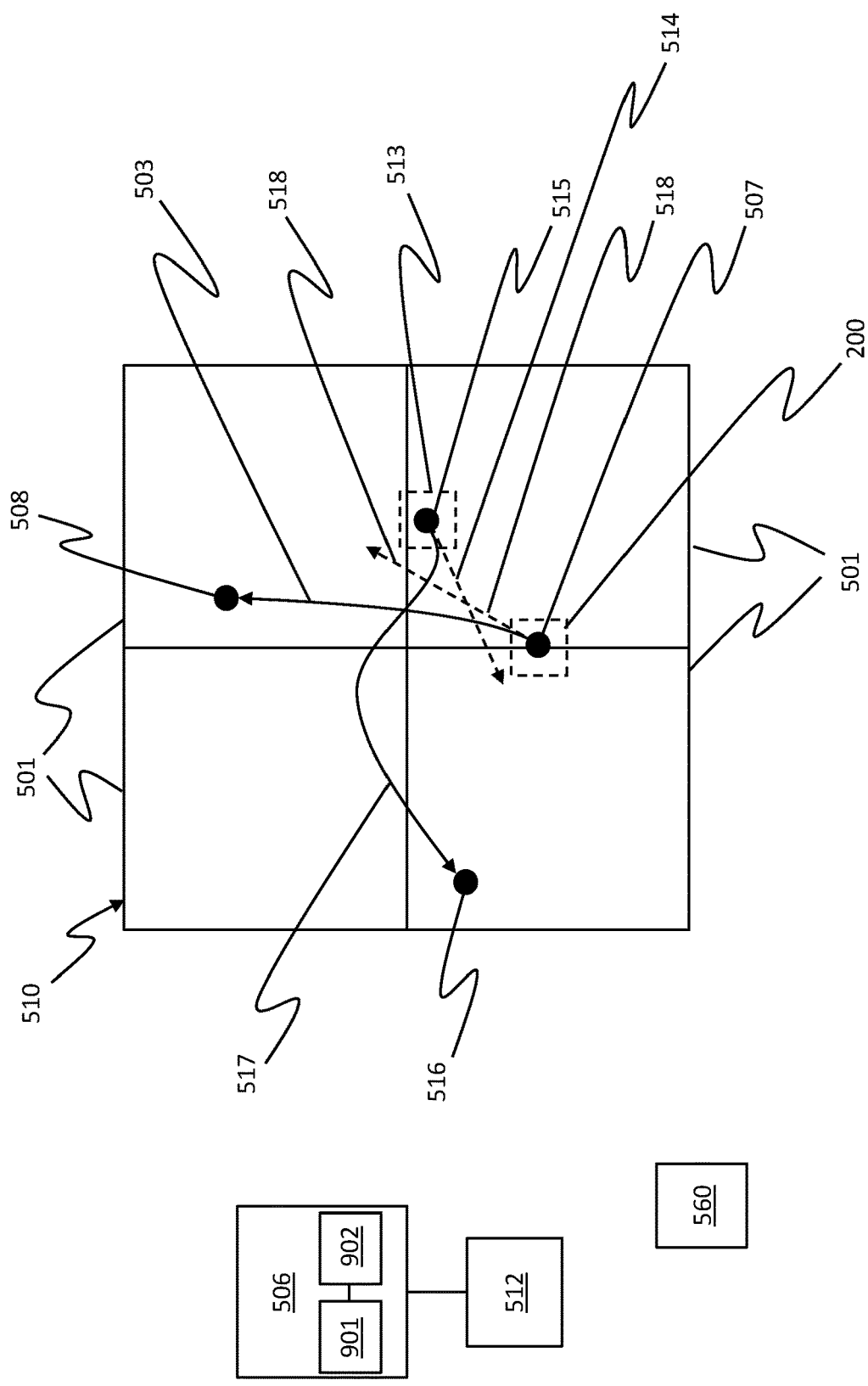
FIG. 9 shows the partial section of a drive surface according to FIG. 7, on which two movers move at a third point in time.

FIG. 9 shows the same situation as in FIG. 7 at an even later point in time than shown in FIG. 8. The first mover 200 has been moved a further distance along the first travel path 503. Due to the once again changed position of the first mover 200 and the further traveled first travel path 503, the current first direction of movement 518 of the first mover 200 has accordingly changed again. Here, the current direction of movement 518 of the first mover 200 now also crosses the second travel path 517 of the second mover 513. The second mover 513 has also been moved a further distance along the second travel path 517. Due to the further changed position of the second mover 513 and the further traveled second travel path 517, the current second direction of movement 514 of the second mover 513 has accordingly changed again, as well. As shown in the embodiment according to FIG. 8, the second direction of movement 514 of the second mover 513 here also crosses the first travel path 503 of the first mover 200.

As may be seen from FIG. 7 to FIG. 9, the first travel path 503 of the first mover 200 determined on the part of the control unit 506 and the second travel path 517 of the second mover 513 determined on the part of the control unit 506 would cross, so that a collision might occur between the first mover 200 and the second mover 513, which, however, must be prevented. As determining the travel paths, i.e. the first travel path 503 for the first mover 200 and the second travel path 517 of the second mover 513, is computationally very intensive and a very large number of position values in combination with time values are generated for each of the travel paths, an exchange of this information for matching the travel paths and thus for collision avoidance would require a large-volume data exchange and would greatly delay the determination of the first travel path 503 and/or the second travel path 517. The method described below in connection with FIGS. 10 and 11 may significantly reduce the required computing capacity and data exchange volume.

Figure 10:
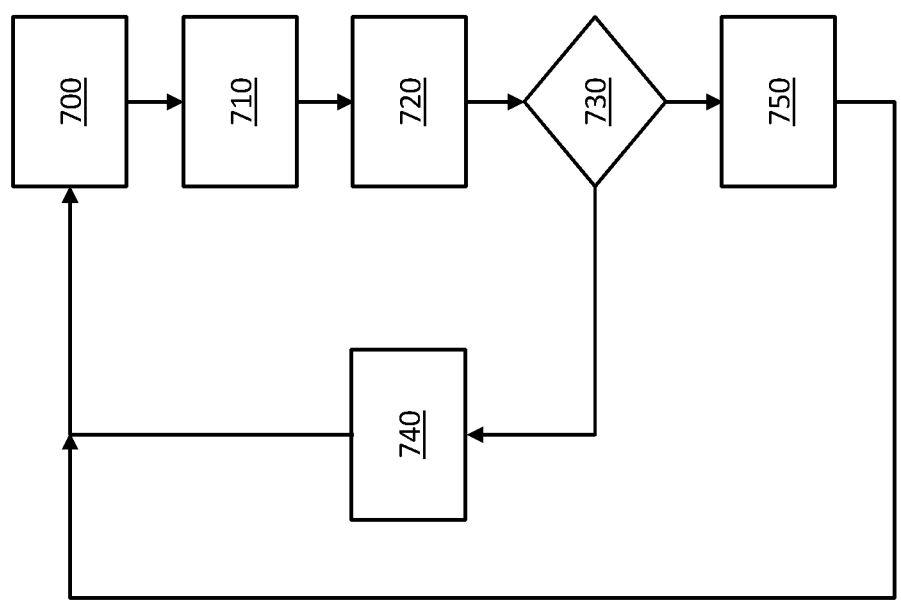
FIG. 10 shows a schematic program sequence for carrying out the process.

Based on the program flow of FIG. 10, a method for a first path planning for the first mover 200 is described, referring at the appropriate place to the corresponding situations according to the illustrations of FIG. 7, 8 or 9.

At the first program point 700, which corresponds to the first situation according to FIG. 7, the current position of the first mover 200 on the drive surface 510 is known to the control unit 506. The current position of the first mover 200 is thus a first starting point 507 for the first path planning. Moreover, the first mover 200 is to be moved from the first starting point 507 to a predetermined first target point 508. The first target point 508 is e.g. stored in the data memory 512. For the first path planning, the control unit 506 has corresponding calculation programs that execute a first path planning for the first mover 200 from the first starting point 507 to the first target point 508 according to predetermined marginal conditions and determine a first travel path 503 for the first mover 200.

The first travel path 503 includes a first path and a determination of when the first mover 200 is located at which point along the first path. Based on the first travel path 503, dynamic planning is carried out to determine at what speed and at what acceleration the first mover 200 must be moved along the first path to maintain the first travel path 503. The control unit 506 is embodied to control the magnetic field generators 127 of the four sectors 501 based on dynamic planning and the first path planning in such a way that the first mover 200 is moved along the desired first travel path 503 from a first starting point 507 to a first target point 508 using the magnetic fields.

The first travel path 503 is determined by the control unit 506 in a subsequent second program point 710. The first travel path 503 is shown schematically in FIGS. 7 to 9 in the form of an arrow that leads from the first starting point 507 to the first target point 508. Depending on the chosen embodiment, the entire first travel path 503 from the first starting point 507 to the first target point 508 may already be determined or a partial section of the first travel path 503 is determined for a predetermined time horizon or for a predetermined travel horizon, i.e. a distance from the current position of the first mover 200.

In a subsequent third program point 720, an estimated second travel distance for the second mover 513 is particularly determined for a predetermined time horizon or travel horizon. In a simple embodiment of the method, the estimated second travel distance is e.g. determined on the basis of the current second direction of movement 514 of the second mover 513. The second direction of movement 514 is schematically shown in FIGS. 7 to 9 as a dashed arrow starting from a center of the second mover 513. Depending on the chosen embodiment, in addition to the second direction of movement 514, the current second speed of the second mover 513 may be taken into account for an estimate of the second travel path. Furthermore, in addition to the second speed of the second mover 513, the second acceleration of the second mover 513 may be taken into account for estimating the second travel distance.

When determining the first travel path 503, the control unit 506 takes into account the estimated second travel path of the second mover 513. In a following fourth program step 730, the control unit 506 checks whether there is a risk of a collision between the first mover 200 and the second mover 513 based on the determined first travel path 503 of the first mover 200 and based on taking the estimated second travel path of the second mover 513 into account. To this end, the control unit checks whether the first travel path 503 and the estimated second travel path cross for a predetermined time horizon. The crossing check may also take into account the extents of the first and second movers 200, 513. In a simple case, the estimated second travel path of the second mover 513 is assumed to be a straight movement of the second mover 513 in the second direction of movement 514. Depending on the chosen embodiment, in addition to the second direction of movement 514, the current second speed of the second mover 513 may be taken into account for an estimate of the second travel path. In this case, the estimated second travel path is estimated based on the second direction of movement 514 and on the current second speed of the second mover 513. In a further embodiment, in addition to the second speed of the second mover 513 the current second acceleration of the second mover 513 is also taken into account for estimating the second travel path, and the estimated second travel distance is calculated based on the current second direction of movement 514, the current second speed, and based on the current second acceleration.

If the check at the fourth program step 730 shows that on the basis of the determined first travel path 503 and taking into account the estimated second travel path, no collision of the first mover 200 with the second mover 513 will occur for a predeterminable time horizon, the danger of a collision is negated and the program branches to the fifth program point 740. This is the case at the time shown according to the situation in FIG. 7, since here the second direction of movement 514 of the second mover 513 does not cross the first path of travel 503 of the first mover 200.

At the fifth program point 740, the control unit 506 actuates the magnetic field generators 127 of the sectors 501 in such a way that the first mover 200 is moved further along the first travel path 503 via the drive surface 510 in the direction of the first target point 508.

The program subsequently branches to the first program point 700 and starts again at the first program point 700.

If the check at the fourth program point 730 shows that there is a risk of a collision, the first travel path 503 is modified in a subsequent sixth program point 750 in such a way that a collision is prevented. This case is shown in FIG. 8 and in FIG. 9. A possible collision of the first mover 200 with the second mover 513 would be detected in this case because the current second direction of movement 514 crosses the first travel path 503 of the first mover 200. When changing the first travel path 503 according to the sixth program point 750, the direction of movement and/or the speed and/or the acceleration of the first mover 200 may be changed in such a way that a collision with the second mover 513 according to the estimated second travel path is prevented. Depending on the chosen embodiment, instead of or in addition to changing the first travel path 503, the second travel path 517 of the second mover 513 may also be changed in such a way that a collision between the first mover 200 and the second mover 513 is prevented. Appropriate strategies for preventing the collision of the two movers 200, 513 may be stored in the data memory 512. For example, a change in direction or a change in speed of the first mover 200 and/or the second mover 513 may be preferred.

After the sixth program point 750, the program branches back to the first program point 700 and the program is run again.

However, since the second mover 513 may always move in a direction other than the estimated second direction due to its own motion, the program run described must be repeated at predetermined time intervals. Thus, the program is run repeatedly in a cyclic manner at predetermined time intervals. The time cycle in which the program is run through cyclically may be in a range between 100 µs to 400 µs or also in a range of up to 2 ms or more.

In addition, depending on the chosen embodiment, the control unit 506 may also carry out a second path planning for the second mover 513. The second path planning includes a planning of a second path and a dynamic planning, which determines at which speed and at which acceleration the second mover 513 is moved along the second path. The second path as well as the speed and possibly the acceleration result in the temporal position of the second mover 513 on the second path referred to as the second travel path 517. Based on the dynamic planning and the path planning, the control unit 506 is embodied to actuate the magnetic field generators 127 of the sectors 501 in such a way that the second mover 513 is moved along the desired second travel path 517 from a second starting point 514 to a second target point 516 using the magnetic fields.

Figure 11:
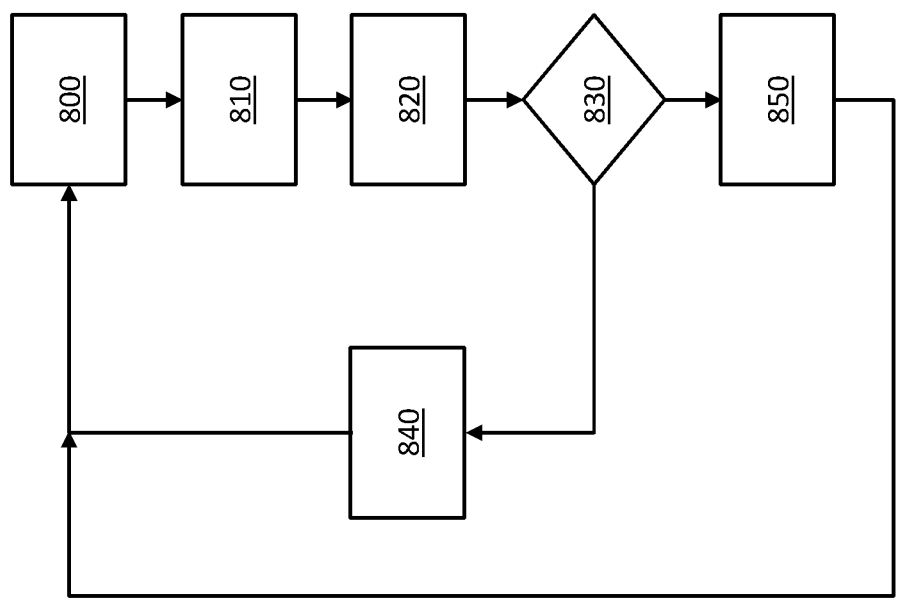
FIG. 11 shows a schematic program sequence for carrying out a further process.

Thus, in an analogous manner as shown in FIG. 11, the planning of the second travel path 517 of the second mover 513 may be performed taking into account an estimated first travel path of the first mover 200 to prevent a collision of the second mover 513 with the first mover 200. In this regard, the control unit 506 performs the second path planning of the second mover 513 from a second starting point 515 to a second target point 516.

Based on the program flow of FIG. 11, a method for a second path planning for the second mover 513 carried out by the control unit 506 is described, referring at the appropriate place to the corresponding situations according to the illustrations of FIG. 7, 8 or 9.

At the first further program point 800, which corresponds to the first situation according to FIG. 7, the current position of the second mover 513 on the drive surface 510 is known to the control unit 506. The current position of the second mover 513 thus is a second starting point 515 for the second path planning. Moreover, the second mover 513 is to be moved from the second starting point 515 to a predetermined second target point 516. The second target point 516 is e.g. stored in the data memory 512. For the second path planning, the control unit 506 has corresponding calculation programs that execute a second path planning for the second mover 513 from the second starting point 515 to the second target point 516 according to predetermined boundary conditions and determine a second travel path 517 for the second mover 513.

The second travel path 517 is determined by the control unit 506 in a subsequent further second program point 810. The second travel path 517 is schematically shown in FIGS. 7 to 9 in the form of an arrow leading from the second starting point 515 to the second target point 516. Depending on the chosen embodiment, the entire second travel path 517 from the second starting point 515 to the second target point 516 may already be determined or a partial section of the second travel path 517 is determined for a predetermined time horizon or for a predetermined path horizon, i.e. a distance from the current position of the second mover 513.

In a subsequent further third program point 820, an estimated first travel distance for the first mover 200 is in particular determined for a predetermined time horizon or travel horizon. In a simple embodiment of the method, the estimated first travel path is e.g. determined based on the current first direction of movement 518 of the first mover 200. The first direction of movement 518 is schematically shown in FIGS. 7 to 9 as a dashed arrow starting from a center of the first mover 200. Depending on the chosen embodiment, in addition to the first direction of movement 518, the current first speed of the first mover 200 may be taken into account for estimating the first travel path. Furthermore, in addition to the first speed of the first mover 200, the first acceleration of the first mover 200 may be taken into account for estimating the first travel path.

When determining the second travel path 517, the control unit 506 takes into account the estimated first travel path of the first mover 200. In a following further fourth program point 830, the control unit 506 checks whether there is a risk of a collision between the second mover 513 and the first mover 200 based on the determined second travel path 517 and based taking the estimated first travel path of the first mover 200 into account. To this end, the control unit 506 checks for a predetermined time horizon whether the second travel path 517 and the estimated first travel path cross. The check of the crossing may also take the extents of the first and second movers 200, 513 into account. In a simple case, the estimated first travel path of the first mover 200 is considered to be a straight movement of the first mover 200 in the first direction of movement 518. Depending on the chosen embodiment, the current first speed of the first mover 200 may in addition to the first direction of movement 518 be considered for an estimate of the first travel distance. In this case, the estimated first travel path is estimated based on the first direction of movement 518 and the current first speed of the first mover 200. In a further embodiment, in addition to the current first speed of the first mover 200, the current first acceleration of the first mover 200 is taken into account, as well, in estimating the first travel distance, and the estimated first travel path is calculated based on the current first direction of movement 518, the current first speed, and based on the current first acceleration.

If the check at the further fourth program point 830 shows that, on the basis of the determined second travel path 517 and taking into account the estimated first travel path, no collision of the second mover 513 with the first mover 200 will occur for a predeterminable time horizon, the danger of a collision is negated and the program branches to the further fifth program point 840. This is the case for the simplest embodiment, in which only the first direction of movement 518 is taken into account, at the times shown in FIGS. 7 and 8, since here the first direction of movement 518 of the first mover 200 does not cross the second travel path 517 of the second mover 513.

At the further fifth program point 840, the control unit 506 controls the magnetic field generators 127 of the sectors 501 in such a way that the second mover 513 is moved further over the drive surface 510 along the second travel path 517 in the direction of the second target point 516.

The program subsequently branches to the further first program point 800 and starts again at the further first program point 800.

If the check at the further fourth program point 830 shows that there is a danger of a collision, the second travel path 517 is changed in such a way in a subsequent further sixth program point 850 that a collision is prevented. The danger of a collision is recognizable here at the time shown in FIG. 9, because here the first direction of movement 518 of the first mover 200 crosses the second travel path 517 of the second mover 513. When the second travel path 517 is changed according to the further sixth program point 850, the direction of movement and/or the speed and/or the acceleration of the second mover 513 may be changed in such a way that a collision with the first mover 200 according to the estimated first travel path is prevented. Depending on the chosen embodiment, instead of or in addition to changing the second travel path 517, the first travel path 503 of the first mover 200 may also be changed in such a way that a collision between the first mover 200 and the second mover 513 is prevented. Appropriate strategies for preventing the collision of the two movers 200, 513 may be stored in the data memory 512. For example, a change in direction or a change in speed of the first mover 200 and/or the second mover 513 may be preferred.

After the further sixth program point 850, the program branches back to the further first program point 800 and the program is run again.

However, since the first mover 200 may always move in a direction other than the estimated first direction due to its own motion, the program run described must be repeated at predetermined time intervals. Thus, the program is run repeatedly in a cyclic manner at predetermined time intervals. The time cycle in which the program is cyclically run through may be in a range between 100 µs to 400 µs or in a range up to 2 ms or more.

In an embodiment, a further reduction in computing capacity and data exchange quantity may be achieved by carrying out only a comparison of the current first direction of movement 514 with the current second direction of movement 518 instead of the determined first travel path 503 and taking into account the estimated second travel path or, respectively, instead of the determined second travel path 517 and taking into account of the estimated first travel path in the first or second path planning, so that a comparison to the determined first travel path 503 or determined second travel path 517 no longer needs to be performed.

As shown in FIGS. 7 to 9, the control unit 506 may carry out the first path planning using a first planning program 901 and e.g. the second path planning using a second planning program 902. In addition, depending on the chosen embodiment, the estimated first travel path may be determined by the first planning program 901 and the estimate of the second travel path may be determined by the second planning program 902. Thus, for carrying out the first path planning and estimating a possible collision between the first mover 200 and the second mover 513, only the estimated second travel path needs to be transmitted from the second planning program 902 to the first planning program 901. Similarly, for the second path planning only the estimated first travel path needs to be transmitted from the first planning program 901 to the second planning program 902.

Figure 12:
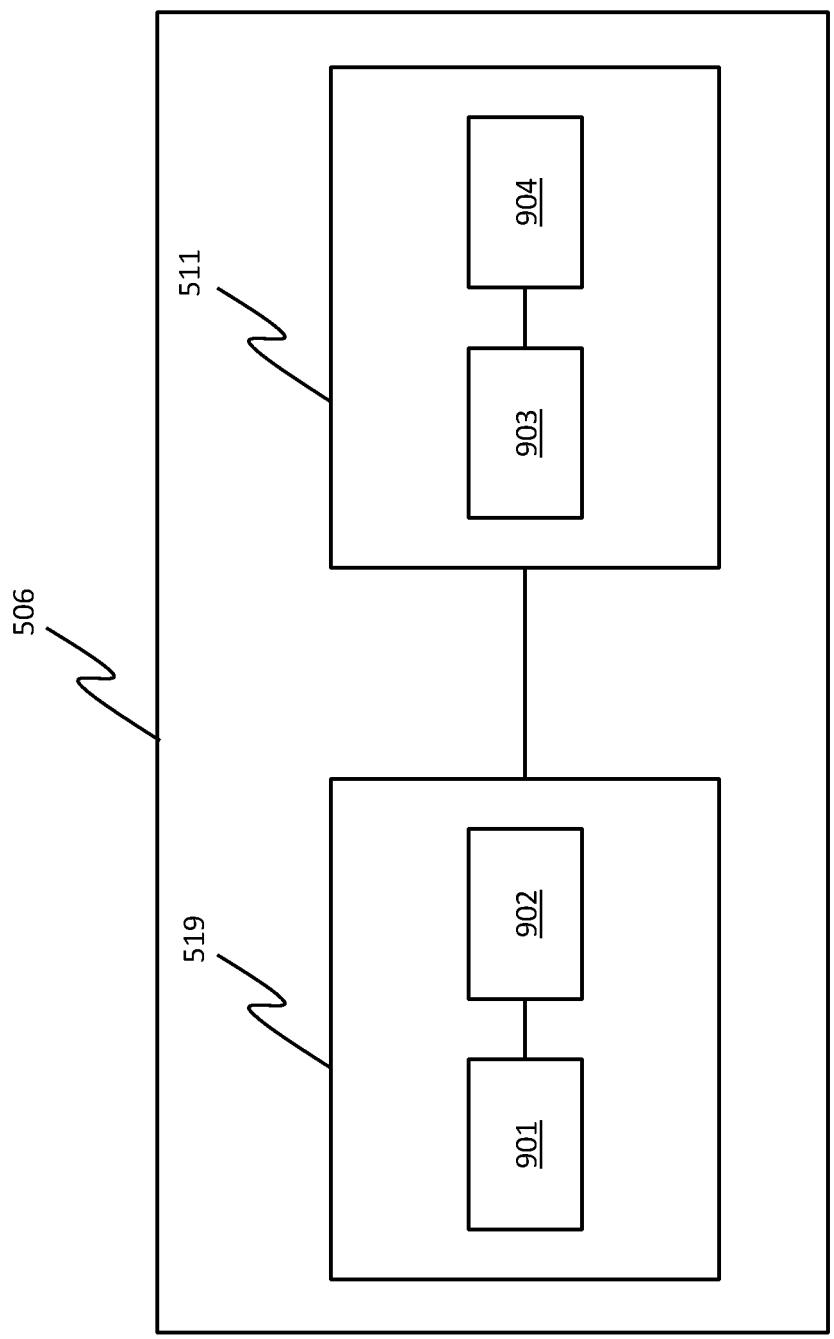
FIG. 12 shows a system with two control units.

FIG. 12 shows an embodiment in which the control unit 506 may be divided into a first partial control unit 519 and additionally into a second partial control unit 511, wherein the first partial control unit 519 may exchange data with the second partial control unit 511. The second partial control unit 511 has at least a first further planning program 903 or additionally a second further planning program 904. In this arrangement, the first path planning may be performed by the first partial control unit 519 and the second path planning may be performed by the second partial control unit 511. In this arrangement, the estimated first travel path is transmitted from the first partial control unit 519 to the second partial control unit 511. In addition, the estimated second travel path is transmitted from the second partial control unit 511 to the first partial control unit 519. The first and second partial control units 519, 511 may e.g. represent different computing cores of a computing system.

By means of the described method, it is not necessary for complex information about exact path planning and dynamic planning, i.e., travel path planning of the first and second movers 200, 513, to be exchanged or taken into account in the travel path planning of a first or second mover 200, 513 and in collision avoidance between the two movers 200, 513. For example, the estimated travel path of the first and/or second mover 200, 513, may be linearly extrapolated while maintaining the same direction of movement and/or speed and/or acceleration and/or jolt. For collision avoidance, for example, only this linear extrapolation is considered for the travel path planning of the other first and/or second mover(s) 200, 513. The extrapolation may only be valid for a small period of time, but since the path planning is usually revised cyclically, the extrapolation is sufficient to prevent a collision. In addition, extrapolation offers the advantage that data from more distant movers need not be included in collision planning. If it is estimated for the given time horizon that the estimated second travel path of the second mover 513 cannot lead to a collision with the first travel path 503 of the first mover, then the estimated second travel path of the second mover 513 need not be considered in the path planning of the first travel path 503 of the first mover 200.

The travel path includes a planned path and a future calculated position of the mover along the path.

With the described method, the amount of data that must be taken into account in path planning is significantly reduced. This allows for a better scalability of the system even for a larger number of movers.

TABLE 1

List of references

| | |
|---|---|
| 1 | planar drive system |
| 8 | top side |
| 9 | bottom side |
| 10 | stator module |
| 11 | stator surface |
| 12 | first direction |
| 14 | second direction |
| 15 | vertical direction |
| 18 | connecting line |
| 19 | module housing |
| 30 | outer edge of stator surface |
| 100 | stator assembly |
| 104 | first stator layer |
| 105 | second stator layer |
| 106 | third stator layer |
| 107 | fourth stator layer |
| 110 | first stator sector |
| 112 | third stator sector |
| 113 | second stator sector |
| 114 | fourth stator sector |
| 120 | first stator segments |
| 121 | second stator segments |

TABLE 1-continued

List of references

| | |
|---|---|
| 125 | conductor strips |
| 126 | further conductor strips |
| 127 | magnetic field generator |
| 200 | mover |
| 201 | magnet arrangement |
| 206 | first rotor direction |
| 208 | second rotor direction |
| 210 | first magnet unit |
| 211 | drive magnet |
| 220 | second magnet unit |
| 221 | further drive magnet |
| 230 | third magnet unit |
| 240 | fourth magnet unit |
| 250 | second magnetic field generator |
| 501 | sector |
| 502 | first mover |
| 503 | first travel path |
| 506 | control unit |
| 507 | starting point |
| 508 | target point |
| 509 | obstacle |
| 510 | drive surface |
| 511 | second partial control unit |
| 512 | data memory |
| 513 | second mover |
| 514 | second direction of movement |
| 515 | second starting point |
| 516 | second target point |
| 517 | second travel path |
| 518 | first direction of movement |
| 519 | first partial control unit |
| 560 | sensor |
| 901 | first planning program |
| 902 | second planning program |
| 903 | further planning program |
| 904 | further second planning program |

The invention claimed is:

1. A device for preventing a collision when driving at least two movers on a drive surface, each mover comprising at least one second magnetic field generator for generating a magnetic field, the device comprising:
a plurality of plate-shaped sectors, the sectors each comprising at least one electric magnetic field generator for generating magnetic fields, wherein the sectors form the drive surface,
wherein the sectors are connected to a control unit, wherein the control unit is embodied to generate the magnetic fields via a corresponding control of a power supply of the electric magnetic field generators in such a way that the movers are movable in at least one direction over the drive surface,
wherein the control unit is embodied to perform a first path planning for the first mover,
wherein the control unit is embodied to determine or receive an estimated second travel path of the second mover, and
wherein the control unit is embodied to take the estimated second travel path of the second mover into account in the first path planning of the first mover in order to determine a first travel path for the first mover in such a way that a collision of the first mover with the second mover is prevented,
the control unit being embodied to actuate the electric magnetic field generators with current in such a way that the first mover is movable over the drive surface along the determined first travel path.

2. The device according to claim 1, wherein the control unit is embodied to determine the estimated second travel path based on a current second direction of movement of the second mover.

3. The device according to claim 1, wherein the control unit is embodied to determine the estimated second travel path based on a linear extrapolation of the current second travel path of the second mover with a constant second direction of movement and/or second speed and/or second acceleration and/or change of the second acceleration.

4. The device according to claim 1, wherein the control unit is embodied to repeatedly determine or repeatedly receive the estimated second travel path of the second mover at predetermined time intervals and to repeatedly take it into account in the first path planning of the first travel path of the first mover at the predetermined time intervals, wherein the control unit is embodied to carry out the repeated determination or repeated receipt of the estimated second travel path of the second mover and the repeated consideration of the estimated second travel path in the first path planning of the first mover at a time interval of 100 µs to 2000 µs.

5. The device according to claim 1, wherein the control unit is embodied to take the estimated second travel path into account in the first path planning of the first travel path if a collision of the first mover with the second mover is likely within a predetermined time period.

6. The device according to claim 1, wherein the control unit is embodied to take the estimated second travel path into account in the first path planning of the first travel path if the estimated second travel path crosses the determined first travel path within a predetermined time period.

7. The device according to claim 1, wherein the control unit is embodied to perform a second path planning for the second mover,
wherein the control unit is embodied to determine or receive an estimated first travel path of the first mover, and
wherein the control unit is embodied to take the estimated first travel path of the first mover into account in the second path planning of the second mover in order to determine a second travel path for the second mover in such a way that a collision of the second mover with the first mover is prevented,
the control unit being embodied to actuate the electric magnetic field generators of the sectors with current in such a way that the second mover is movable over the drive surface along the determined second travel path.

8. The device according to claim 1, wherein the control unit comprises at least a first partial control unit and a second partial control unit,
wherein the first path planning for the first mover is executed by the first partial control unit and the second path planning for the second mover is executed by the second partial control unit, or
wherein the first path planning for the first mover is executed by a first planning program and the second path planning for the second mover is executed by a second planning program, wherein the estimated first travel path of the first mover is determined by the first partial control unit or by the first planning program, wherein the estimated second travel path of the second mover is determined by the second partial control unit or by the second planning program, wherein the estimated second travel path is received by the first partial control unit or by the first planning program, and wherein the estimated first travel path is received from the second partial control unit or from the second planning program.

9. A method for preventing a collision when driving at least two movers on a drive surface, each mover comprising at least one magnetic field generator, wherein a device comprises a plurality of plate-shaped sectors, the sectors each comprising at least one electric magnetic field generator for generating magnetic fields, the sectors forming the drive surface, wherein a first path planning for the first mover is carried out, wherein an estimated second travel path of the second mover is determined or received, and wherein the estimated second travel path of the second mover is taken into account in the first path planning of the first mover to determine a first travel path for the first mover in such a way that a collision of the first mover with the second mover is prevented.

10. The method according to claim 9, wherein the estimated second travel path is determined based on a current second direction of movement of the second mover.

11. The method according to claim 9, wherein the estimated second travel path is determined based on a linear extrapolation of the current second travel path of the second mover with a constant second direction of movement and/or second speed and/or second acceleration and/or change of the second acceleration.

12. The method according to claim 11, wherein the estimated second travel path of the second mover is repeatedly determined or received at predetermined time intervals and is repeatedly considered in the first path planning of the first travel path of the first mover at the predetermined time intervals, wherein estimating the second travel path of the second mover or receiving the estimated second travel path of the second mover is repeated, and wherein the first path planning of the first travel path of the first mover is repeatedly carried out at time intervals of 100 μs to 2000 μs taking into account the estimated second travel path of the second mover.

13. The method according to claim 9, wherein the estimated second travel path is taken into account in the first path planning of the first travel path if the estimated second travel path crosses the determined first travel path within a predetermined time period, wherein the time period is particularly in the range of 100 μs to 2 s.

14. The method according to claim 11, wherein a second path planning is carried out for the second mover, wherein an estimated first travel path of the first mover is taken into account in the second path planning of the second mover in order to determine a second travel path for the second mover in such a way that a collision of the second mover with the first mover is prevented, and wherein the electric magnetic field generators are supplied with current in such a way that the second mover is movable over the drive surface along the determined second travel path.

15. A device for preventing a collision when driving at least two movers on a drive surface, each mover comprising at least one magnetic field generator for generating a magnetic field, the device comprising:

a plurality of plate-shaped sectors, the sectors each comprising at least one electric magnetic field generator for generating magnetic fields, wherein the sectors form the drive surface, wherein the sectors are connected to a control unit, wherein the control unit is embodied to generate magnetic fields via a corresponding control of a power supply of the electric magnetic field generators of the sectors in such a way that the movers are movable in at least one direction over the drive surface, wherein the control unit is embodied to perform a path planning for the movers, wherein the control unit is embodied to determine travel paths for the movers in such a way that a collision of movers is prevented, the control unit being embodied to actuate the electric magnetic field generators of the sectors with current in such a way that the movers are movable over the drive surface along the determined travel path, wherein the control unit is embodied, when determining a travel path for a first mover to respectively take into account estimated travel paths for the further mover, wherein in case of the risk of a collision between the movers, the travel paths of the movers are changed according to the priorities assigned to the movers, said priorities determining priority and avoidance rules, wherein only for movers having a low priority a change of their travel paths is carried out based on the estimate of the travel paths of the movers with higher priority, and wherein the estimated travel paths of the further movers are to be repeatedly determined or repeatedly received at predetermined time intervals and when determining the travel path for the first mover are to be repeatedly considered at predetermined time intervals.

16. The device of claim 15, wherein the control unit is embodied to determine the estimated travel paths based on a current direction of movement of the further movers.

17. The device according to claim 15, wherein:

the control unit is embodied to determine the estimated travel paths based on a current speed and/or an acceleration and/or a change in the acceleration of the further mover, and wherein the control unit is embodied to determine the estimated travel paths based on a linear extrapolation of the current travel path of the further movers with a constant direction of movement and/or speed and/or acceleration and/or change of the acceleration.

18. The device according to claim 15, wherein the predetermined repeat intervals are time intervals in the range of 100 μs to 2000 μs.

19. The device according to claim 15, wherein the control unit is embodied to take the estimated travel paths into account in the first path planning of the first travel path if the estimated travel paths crosses the determined first travel path within a predetermined time period, wherein the predetermined time period is in a range of 100 μs to 2 s.

20. The device according to claim 15, wherein the control unit comprises at least a first partial control unit and a second partial control unit, wherein the first path planning for the first mover is executed by the first partial control unit and the second path planning for the further mover is executed by a second partial control unit, or wherein the first path planning for the first mover is executed by a first planning program and the second path planning for the further mover is executed by a second planning program, and wherein the estimated first travel path of the first mover is determined by the first partial control unit or by the first planning program, wherein the estimated second travel path of the further mover is determined by the second partial control unit or by the second planning program, and wherein the estimated second travel path is received by the first partial control unit or by the first planning program, and wherein the estimated first travel path is received from the second partial control unit or from the second planning program.

* * * * *

UNITED STATES PATENT AND TRADEMARK OFFICE
CERTIFICATE OF CORRECTION

PATENT NO. : 11,855,557 B2
APPLICATION NO. : 17/324911
DATED : December 26, 2023
INVENTOR(S) : Thomas Luthe et al.

It is certified that error appears in the above-identified patent and that said Letters Patent is hereby corrected as shown below:

In the Specification

At Column 1, Line 13:
"Vorrichtung and Verfahren"
Should be:
--Vorrichtung und Verfahren--

Signed and Sealed this
Ninth Day of April, 2024

Katherine Kelly Vidal
*Director of the United States Patent and Trademark Office*